United States Patent
Rugeland et al.

(10) Patent No.: US 11,895,541 B2
(45) Date of Patent: Feb. 6, 2024

(54) WIRELESS DEVICE MOBILITY

(71) Applicant: Telefonaktiebolaget LM Ericsson (publ), Stockholm (SE)

(72) Inventors: Patrik Rugeland, Stockholm (SE); Icaro L. J. Da Silva, Solna (SE); Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 406 days.

(21) Appl. No.: 17/421,141

(22) PCT Filed: Dec. 23, 2019

(86) PCT No.: PCT/SE2019/051343
§ 371 (c)(1),
(2) Date: Jul. 7, 2021

(87) PCT Pub. No.: WO2020/145868
PCT Pub. Date: Jul. 16, 2020

(65) Prior Publication Data
US 2022/0150768 A1    May 12, 2022

Related U.S. Application Data

(60) Provisional application No. 62/789,886, filed on Jan. 8, 2019.

(51) Int. Cl.
*H04W 76/16* (2018.01)
*H04W 36/00* (2009.01)
(Continued)

(52) U.S. Cl.
CPC ..... *H04W 36/0066* (2013.01); *H04W 64/006* (2013.01); *H04W 68/005* (2013.01); *H04W 76/16* (2018.02); *H04W 88/06* (2013.01)

(58) Field of Classification Search
CPC .............................. H04W 36/00; H04W 76/16
See application file for complete search history.

(56) References Cited

U.S. PATENT DOCUMENTS

| 2014/0235261 A1* | 8/2014 | Fan ....................... H04W 24/04 455/452.1 |
| 2017/0180512 A1* | 6/2017 | Simkin ................... H04L 67/10 |
| 2019/0159074 A1* | 5/2019 | Velev .................. H04W 36/305 |

OTHER PUBLICATIONS

International Search Report and Written Opinion dated Feb. 19, 2020 for International Application No. PCT/SE2019/051343 filed Dec. 23, 2019, consisting of 16-pages.
(Continued)

*Primary Examiner* — Michael T Vu
(74) *Attorney, Agent, or Firm* — Christopher & Weisberg, P.A.

(57) ABSTRACT

A wireless device is configured to operate in first and second access networks. The first and second access networks respectively provide access to first and second core networks of different types. A first wireless communication network includes the first access network and the first core network. A second wireless communication network includes the second access network and the second core network. The wireless device is configured to receive, from the first access network, control signaling indicating that the wireless device is to suspend a connection with the first access network and indicating a notification area within which the wireless device is allowed to move without notifying either the first and second wireless communication networks. The control signaling indicates the notification area includes one or more areas of the first wireless communication network and one or more areas of the second wireless communication network.

14 Claims, 22 Drawing Sheets

(51) Int. Cl.
*H04W 64/00* (2009.01)
*H04W 68/00* (2009.01)
*H04W 88/06* (2009.01)

(56) References Cited

OTHER PUBLICATIONS

3GPP TS 38.331 V15.3.0; 3rd Generation Partnership Project; Technical Specification Group Radio Access Network; NR; Radio Resource Control (RRC) protocol specification (Release 15), Sep. 2018, consisting of 445-pages.

3GPP TS 36.331 V15.3.0; 3rd Generation Partnership Project; Technical Specification Group Radio Access Network; Evolved Universal Terrestrial Radio Access (E-UTRA); Radio Resource Control (RRC); Protocol specification (Release 15), Sep. 2018, consisting of 918-pages.

3GPP TSG-RAN WG2 NR AdHoc R2-1700234; Title: State Transitions for NR UE; Agenda Item: 3.2.2.3; Source: InterDigital Communications; Document for: Discussion, Decision; Date and Location: Jan. 17-19, 2017, Spokane, Washington, consisting of 3-pages.

3GPP TSG-RAN WG2 #97bis Tdoc R2-1702818; Title: Mobility between LTE and NR for inactive UEs; Agenda Item: 10.4.1.5; Source: Ericsson; Document for: Discussion, Decision; Date and Location: Apr. 3-7, 2017, Spokane, USA, consisting of 6-pages.

3GPP TSG-RAN WG3 Meeting #93 R2-161671; Title: Paging and location management in inactive mode; Agenda Item: 10.2.1; Source: Qualcomm Incorporated; Document for: Approval; Date and Location: Aug. 22-26, 2016, Gothenburg, Sweden, consisting of 5-pages.

3GPP TSG-RAN WG2 #96 R2-168077 Revision of R2-167136; Title: UE state transition diagram for NR; Agenda Item: 9.2.2.1; Source: NTT Docomo, Inc.; Document for: Discussion and decision; Date and Location: Nov. 14-18, 2016, Reno, USA, consisting of 7-pages.

* cited by examiner

WIRELESS DEVICE MOBILITY

CROSS-REFERENCE TO RELATED APPLICATIONS

This application is a Submission Under 35 U.S.C. § 371 for U.S. National Stage Patent Application of International Application No.: PCT/SE2019/051343, filed Dec. 23, 2019 entitled "WIRELESS DEVICE MOBILITY," which claims priority to U.S. Provisional Application No. 62/789,886, filed Jan. 8, 2019, the entireties of both of which are incorporated herein by reference.

TECHNICAL FIELD

The present application relates generally to wireless communication, and relates more specifically to mobility of a wireless communication device.

BACKGROUND

In legacy wireless communication networks, such as those based on Long Term Evolution (LTE), a wireless device releases a connection (e.g., a radio resource control, RRC, connection) to an access network when the device has not actively used the connection for some time. The connection between the access network and the core network is also released. This frees the resources consumed by the connections for use by other devices. But the device discards the context for the connection with the access network when it outright releases the connection, meaning that the device will have to fully re-negotiate the context in order to later re-connect to the network.

In modern wireless communication networks, such as those based on New Radio (NR), a wireless device may just suspend its connection with the access network during relatively brief periods of inactivity. The device preserves the context for the connection when the connection is merely suspended, so that the connection can be more quickly resumed if needed using the preserved context. And the connection between the access network and the core network remains intact. If inactivity continues for longer than a brief time, the device may only then release its connection with the access network.

The ability to merely suspend a connection in some types of networks but not others complicates procedures for supporting mobility between those networks. For example, when a device with a suspended connection to one access network engages in mobility to a different access network that does not support suspended connections, one approach to handling such mobility is for the device to release the connection and discard the context for the connection. This approach, however, may problematically lead to excessive control signalling, especially when mobility between the networks occurs frequently. Indeed, under this approach, the wireless device must transmit control signalling (e.g., for updating the network about its location) each time the device engages in mobility between the different types of networks.

SUMMARY

According to some embodiments herein, a notification area within which a wireless device with a suspended access network connection is allowed to move without transmitting control signalling includes areas of multiple wireless communication networks, e.g., one of which supports suspended access network connections and one of which lacks such support. Accordingly, mobility of the wireless device within the notification area, even if that mobility involves mobility between the wireless communication networks, will not trigger the device to transmit signalling (e.g., in the form of a location update or connection request). And this may be the case even if the source network (e.g., NR/5GC) supports suspended access network connections but the target network (e.g., LTE/EPC) lacks such support.

Moreover, according to some embodiments, the wireless device may preserve the context for any connection that the device has suspended with the source access network, even after the device has engaged in mobility to a target network, e.g., that lacks support for suspended connections. This way, if the device engages in mobility back to the original source access network, e.g., before establishing a connection with the original target access network, the device may resume the connection with the original source access network using the preserved context. But, if the device at some point becomes active in the original target access network such as through connection establishment, the device may then discard the context, e.g., so as to fallback to the target network that lacks support for suspended connections.

More particularly, embodiments herein include a method performed by a wireless device configured to operate in first and second access networks. The first and second access networks respectively provide access to first and second core networks of different types. A first wireless communication network comprises the first access network and the first core network. A second wireless communication network comprises the second access network and the second core network. The method comprises receiving, from the first access network, control signaling indicating that the wireless device is to suspend a connection with the first access network and indicating a notification area within which the wireless device is allowed to move without notifying either the first and second wireless communication networks. The control signaling indicates the notification area includes one or more areas of the first wireless communication network and one or more areas of the second wireless communication network.

In some embodiments, the method further comprises: suspending the connection with the first access network according to the control signaling; and transmitting or not transmitting to the second access network signaling indicating that the wireless device is in an area of the second wireless communication network or that the wireless device requests a connection to the second access network, depending on whether the area of the second wireless communication network in which the wireless device is located is included in the notification area.

In some embodiments, said transmitting or not transmitting comprises transmitting or not transmitting the signaling to the second access network: upon the wireless device entering, camping in, or moving into the area of the second wireless communication network; or upon the wireless device entering, camping in, moving into, or selecting a cell that is or is included in the area of the second wireless communication network.

In some embodiments, said transmitting or not transmitting comprises transmitting or not transmitting the signaling, depending respectively on whether the area is not included or is included in the notification area.

In some embodiments, the method further comprises starting a timer upon the wireless device entering, camping in, or moving into the area of the second wireless communication network. In this case, aid transmitting or not transmitting comprises: if the area is not included in the notification area, transmitting the signaling upon expiry of the timer; or refraining from transmitting the signaling if either: the area is included in the notification area; or the area is not included in the notification but the timer does not expire.

In some embodiments, the method comprises monitoring a paging channel of the second access network for a paging message directed to the wireless device, using a paging identifier assigned to the wireless device by the first wireless communication network. In one such embodiment, the method further comprises receiving a paging message on the monitored paging channel; and responsive to receiving the paging message, transmitting to the second access network signaling indicating that the wireless device is in an area of the second wireless communication network or that the wireless device requests a connection to the second access network.

In some embodiments, the one or more areas of the first wireless communication network include or cover one or more cells of the first access network and/or the one or more areas of the second wireless communication network include or cover one or more cells of the second access network. In other embodiments, the one or more areas of the first wireless communication network include or cover one or more radio access network, RAN, areas of the first access network, wherein each RAN area of the first access network is or is a subset of a tracking area of the first core network, and/or the one or more areas of the second wireless communication network include or cover one or more RAN areas of the second access network, wherein each RAN area of the second access network is or is a subset of a tracking area of the second core network.

In some embodiments, the connection is a radio resource control, RRC, connection, wherein the first core network is a 5G Core, 5GC, core network and the second core network is an Evolved Packet Core, EPC, core network.

In some embodiments, the first access network is a New Radio, NR, access network, and wherein the second access network is a Long Term Evolution, LTE, access network or an Evolved UMTS Terrestrial Radio Access Network, E-UTRAN.

In some embodiments, the control signaling indicates the one or more areas of the first wireless communication network using a subset of area identifiers reserved for the first wireless communication network and indicates the one or more areas of the second wireless communication network using a subset of area identifiers reserved for the second wireless communication network.

In some embodiments, the control signaling includes a sequence of one or more area identity information elements, wherein a subset of possible values of an area identity information element is reserved for indicating areas of the first wireless communication network and a different subset of possible values of an area identity information element is reserved for indicating areas of the second wireless communication network.

In some embodiments, the control signaling indicates the one or more areas of the first wireless communication network and the one or more areas of the second wireless communication network in separate lists of areas dedicated to the first and second wireless communication networks, respectively.

In some embodiments, the method further comprises suspending the connection with the first access network according to the control signaling; engaging in mobility to the second access network; and while the wireless device is inactive in the second access network, preserving a context for the connection to the first access network.

In some embodiments, the first wireless communication network supports suspension of a connection between a wireless device and the first access network, and wherein the second wireless communication network does not support suspension of a connection between a wireless device and the second access network.

Embodiments herein also include a method performed by a first radio access node of a first access network. A first wireless communication network comprises the first access network and a first core network to which the first access network provides access. A second wireless communication network comprises a second access network and a second core network to which the second access network provides access. The first and second core networks are of different types. The method comprises transmitting, from the first radio access node to the wireless device, control signaling indicating that the wireless device is to suspend a connection with the first access network and indicating a notification area within which the wireless device is allowed to move without notifying either of the first and second wireless communication networks. The control signaling indicates the notification area includes one or more areas of the first wireless communication network and one or more areas of the second wireless communication network.

In some embodiments, the method further comprises, for each of the areas of the first and second wireless communication networks, transmitting a paging message to a network node serving the area. The paging message is based on a paging identifier assigned to the wireless device by the first wireless communication network. In one such embodiment, the method further comprises, based on the wireless device responding to the paging message, forwarding user data to a second radio network node in the second access network serving an area in which the wireless device is located.

In some embodiments, the one or more areas of the first wireless communication network include or cover one or more cells of the first access network and/or the one or more areas of the second wireless communication network include or cover one or more cells of the second access network. In other embodiment, the one or more areas of the first wireless communication network include or cover one or more radio access network, RAN, areas of the first access network, wherein each RAN area of the first access network is or is a subset of a tracking area of the first core network, and/or the one or more areas of the second wireless communication network include or cover one or more RAN areas of the second access network, wherein each RAN area of the second access network is or is a subset of a tracking area of the second core network.

In some embodiments, the connection is a radio resource control, RRC, connection, the first core network is a 5G Core, 5GC, core network and the second core network is an Evolved Packet Core, EPC, core network.

In some embodiments, the first access network is a New Radio, NR, access network, and the second access network is a Long Term Evolution, LTE, access network or an Evolved UMTS Terrestrial Radio Access Network, E-UTRAN.

In some embodiments, the control signaling indicates the one or more areas of the first wireless communication network using a subset of area identifiers reserved for the first wireless communication network and indicates the one or more areas of the second wireless communication network using a subset of area identifiers reserved for the second wireless communication network.

In some embodiments, the control signaling includes a sequence of one or more area identity information elements, wherein a subset of possible values of an area identity information element is reserved for indicating areas of the first wireless communication network and a different subset of possible values of an area identity information element is reserved for indicating areas of the second wireless communication network.

In some embodiments, the control signaling indicates the one or more areas of the first wireless communication network and the one or more areas of the second wireless communication network in separate lists of areas dedicated to the first and second wireless communication networks, respectively.

In some embodiments, the first wireless communication network supports suspension of a connection between a wireless device and the first access network, and wherein the second wireless communication network does not support suspension of a connection between a wireless device and the second access network.

Embodiments herein also include corresponding apparatus, computer programs, and carriers such as non-transitory computer-readable storage mediums. For example, embodiments herein include a wireless device configured to operate in first and second access networks. The first and second access networks respectively provide access to first and second core networks of different types. A first wireless communication network comprises the first access network and the first core network. A second wireless communication network comprises the second access network and the second core network. The wireless device is configured (e.g., via communication circuitry and processing circuitry) to receive, from the first access network, control signaling indicating that the wireless device is to suspend a connection with the first access network and indicating a notification area within which the wireless device is allowed to move without notifying either the first and second wireless communication networks. The control signaling indicates the notification area includes one or more areas of the first wireless communication network and one or more areas of the second wireless communication network.

Embodiments herein also include a first radio access node of a first access network. A first wireless communication network comprises the first access network and a first core network to which the first access network provides access. A second wireless communication network comprises a second access network and a second core network to which the second access network provides access. The first and second core networks are of different types. The first radio access node is configured (e.g., via communication circuitry and processing circuitry) to transmit, from the first radio access node to the wireless device, control signaling indicating that the wireless device is to suspend a connection with the first access network and indicating a notification area within which the wireless device is allowed to move without notifying either of the first and second wireless communication networks. The control signaling indicates the notification area includes one or more areas of the first wireless communication network and one or more areas of the second wireless communication network.

DETAILED DESCRIPTION

Figure 1:
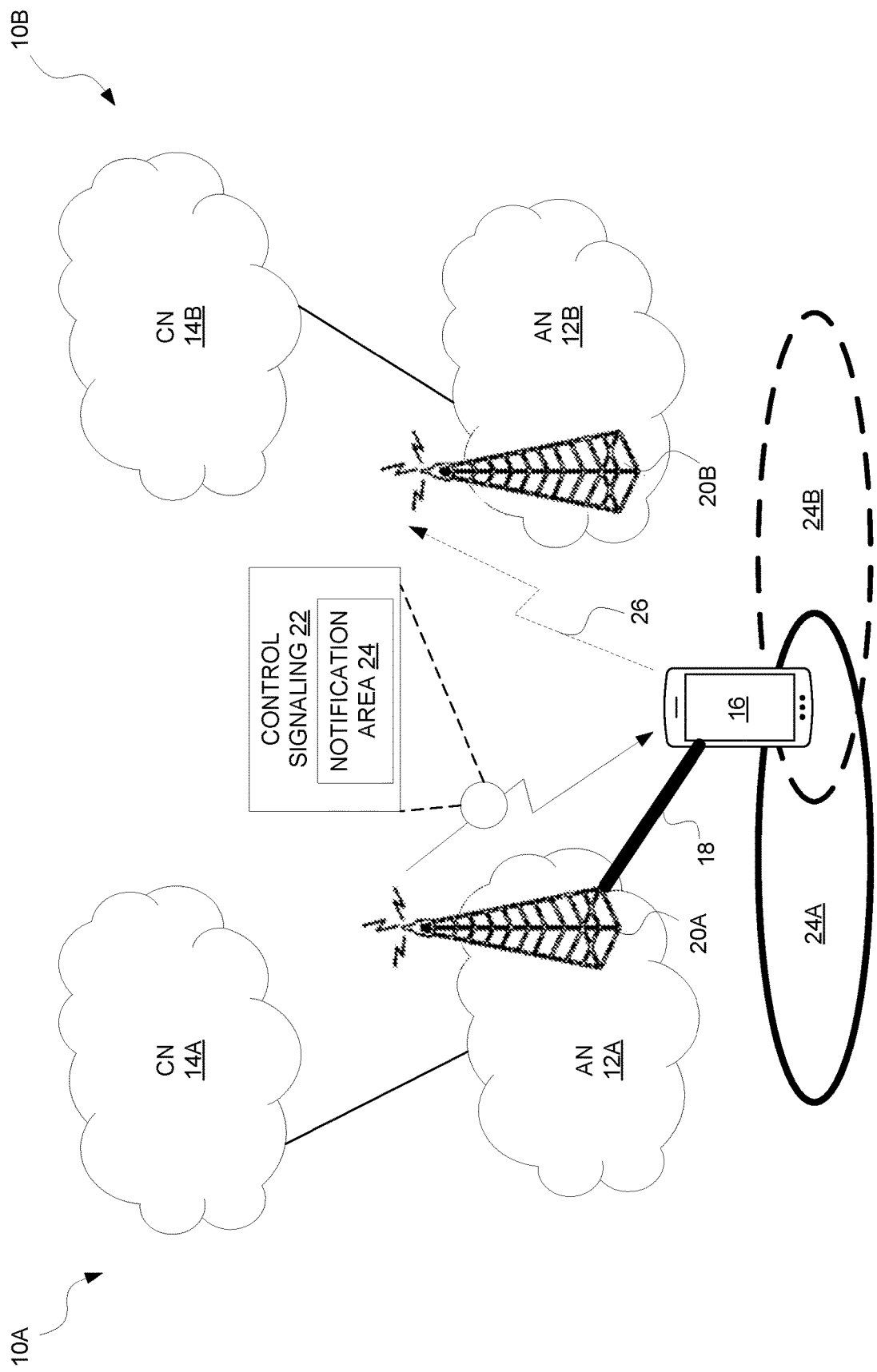
FIG. 1 is a block diagram of wireless communication networks according to some embodiments.

FIG. 1 shows a first wireless communication network 10A and a second wireless communication network 10B according to some embodiments. The first wireless communication network 10A comprises a first access network (AN) 12A and a first core network (CN) 14A. The second wireless communication network 10B comprises a second AN 12B and a second CN 14B. The first and second CNs 14A, 14B are different types of CNs. For example, the first CN 14A may be a 5$^{th}$ Generation Core (5GC) network and the second CN 14B may be an Evolved Packet Core (EPC) network. The first and second ANs 12A, 14B may be the same type (e.g., E-UTRAN) or different types (e.g., NR and E-UTRAN).

Regardless, a wireless device 16 is shown in FIG. 1 as having a connection 18 (e.g., a radio resource control, RRC, connection) with the first AN 12A. The first wireless communication network 10A supports suspension of this connection 18, e.g., after a period of inactivity. In some embodiments, suspension of the connection 18 means the radio resources for the connection 18 are released but the context for the connection 18 is preserved to reduce re-connection latency. Alternatively or additionally, suspension of the connection 18 means the wireless device 16 operates in an inactive state, e.g., RRC_INACTIVE as described later. Regardless, to effect suspension of the connection 18, a first access node 20A in the first AN 12A transmits control signalling 22 to the wireless device 16 indicating that the connection 18 is to be suspended. The wireless device 16 may correspondingly receive the control signalling 22 and suspend the connection 18 according to the control signalling 22.

The control signalling 22 (e.g., in the same or a different control message) may also indicate a so-called notification area 24. The notification area 24 is an area within which the wireless device 16 is allowed to move (e.g., while the connection 18 is suspended) without notifying either of the first and second wireless communication networks 10A, 10B. Notably, the control signaling 22 indicates the notification area 24 includes one or more areas (e.g., cells or RAN areas) of the first wireless communication network 10A and one or more areas (e.g., cells or RAN areas) of the second wireless communication network 10B. For ease of illustration, FIG. 1 simply shows the notification area as including one area 24A of the first wireless communication network 10A and one area 24B of the second wireless communication network 10B. With the notification area 24 defined in this way, the wireless device 16 may engage in mobility between the networks 10A, 10B without notifying either of the networks 10A, 10B, so long as the wireless device 16 stays within the notification area 16.

For example, while the wireless device's connection 18 with the first AN 12A is suspended according to the control signalling 22, the wireless device 16 may engage in mobility (e.g., cell (re)selection) from the first AN 12A to the second AN 12B. This may involve the wireless device 16 selecting a cell/beam of the second AN 12 or camping on a cell/beam of the second AN 12, based on reference signal measurements of that cell/beam, e.g., irrespective of any physical movement of the wireless device 16. Alternatively or additionally, such mobility may involve the wireless device 16 entering or moving into a cell/beam of the second AN 12.

Regardless, as a result of such mobility, the wireless device 16 may switch from being located (e.g., camped in) an area 24A of the first wireless communication network 10A to being located (e.g., camped in) an area 24B of the second wireless communication network 10B. The wireless device 16 may in this regard limit its registration to a single network 10A, 10B at a time, e.g., as opposed to being dually registered in both networks 10A, 10B at the same time. In any event, upon engaging in this mobility, the wireless device 16 may determine whether to transmit signalling 26 to the second AN 12B, e.g., namely, to a second access node 20B serving (a cell of) the area 24B of the second wireless communication network 10B. The signalling 26 may for instance indicate that the wireless device 16 is in that area 24B of the second wireless communication network 10B, e.g., so as to be in the form of a tracking area update or registration update. Or, the signalling 26 may indicate that the wireless device 16 requests a connection to the second AN 12B, e.g., so as to be in the form of a connection request. Regardless, the wireless device 16 may decide whether to transmit this signalling 26 depending (at least in part) on whether this area 24B of the second wireless communication network 10B in which the wireless device 16 is located is included in the notification area 24. In some embodiments,
if the area 24B is included in the notification area 24, the wireless device 16 does not transmit the signalling 26 to the second AN 12B.

Accordingly, mobility of the wireless device 16 within the notification area 24, even if that mobility involves mobility between the wireless communication networks 10A, 10B, will not trigger the device 16 to transmit signalling 26 (e.g., in the form of a location update or connection request). And this may be the case even if the source network 10A supports suspended access network connections but the target network 10B lacks such support.

In any event, mobility of the wireless device 16 to the second access network 12B may involve or result in the wireless device 16 monitoring a paging channel (not shown) of the second access network 12B for a paging message directed to the wireless device 16. Particularly in cases where the wireless device's mobility is confined within the notification area 16, though, the second access network 12B may be unaware of the device's presence and may not itself know how to page the wireless device 16. According to some embodiments, then, the first access node 20A (e.g., upon receiving downlink data for the wireless device 16 while the connection 18 is suspended) may transmit a paging message to the second access node 20B serving the area 24B of the second wireless communication network 10B, e.g., in addition to itself transmitting a paging message in case the wireless device 16 has remained within the area 24A of the first wireless communication network 10A. Notably, the paging message is based on a paging identifier that the first wireless communication network 10A, not the second wireless communication network 10B, assigned to the wireless device 16. The paging identifier may have been assigned to the device 16 at the time the connection 18 was suspended. In some embodiments, the paging identifier (e.g., an I-RNTI) was assigned by the first AN 12A. In other embodiments, the paging identifier is assigned by the first CN 14A. Regardless, the wireless device 16 correspondingly monitors the paging channel of the second AN 12B using the paging identifier assigned to it by the first wireless communication network 10A. If the wireless device 16 indeed receives a paging message, the wireless device 16 in some embodiments may only at that point transmit to the second AN 12B signaling indicating that the wireless device 16 is in the area 24B of the second wireless communication network 10B or that the wireless device 16 requests a connection to the second AN 12B. That is, such signaling may have been delayed until the wireless device 16 was actually paged, rather than being proactively sent upon mobility to the second AN 12B.

Moreover, according to some embodiments, the wireless device 16 may preserve a context for the connection 16 that the device has suspended with the first access network 12A, even after the device 16 has engaged in mobility to the second access network 12B, e.g., that lacks support for suspended connections. The context for the connection 16 may include for instance an identifier of the device 16 on the connection (e.g., a Resume ID or I-RNTI, access stratum security keys, bearer configurations, or the like). With this and/or other information preserved in the context, if the device 16 engages in mobility back to the first access network 12A, e.g., before establishing a connection with the second access network 12B, the device 16 may resume the connection 18 with the first access network 12A using the preserved context. In such a case, then, the device 16 may engage in mobility to the second AN 12B without triggering signalling 26 as long as the device 16 stays within the (multi-system) notification area 24 and may return back to the first AN 12A to resume its connection 18 with the context preserved for that connection 16. But, in some embodiments, if the device 16 at some point becomes active in the second access network 12B such as through connection establishment, the device 16 may then discard the context, e.g., so as to fallback to the second access network 12B that lacks support for suspended connections.

Figure 2:
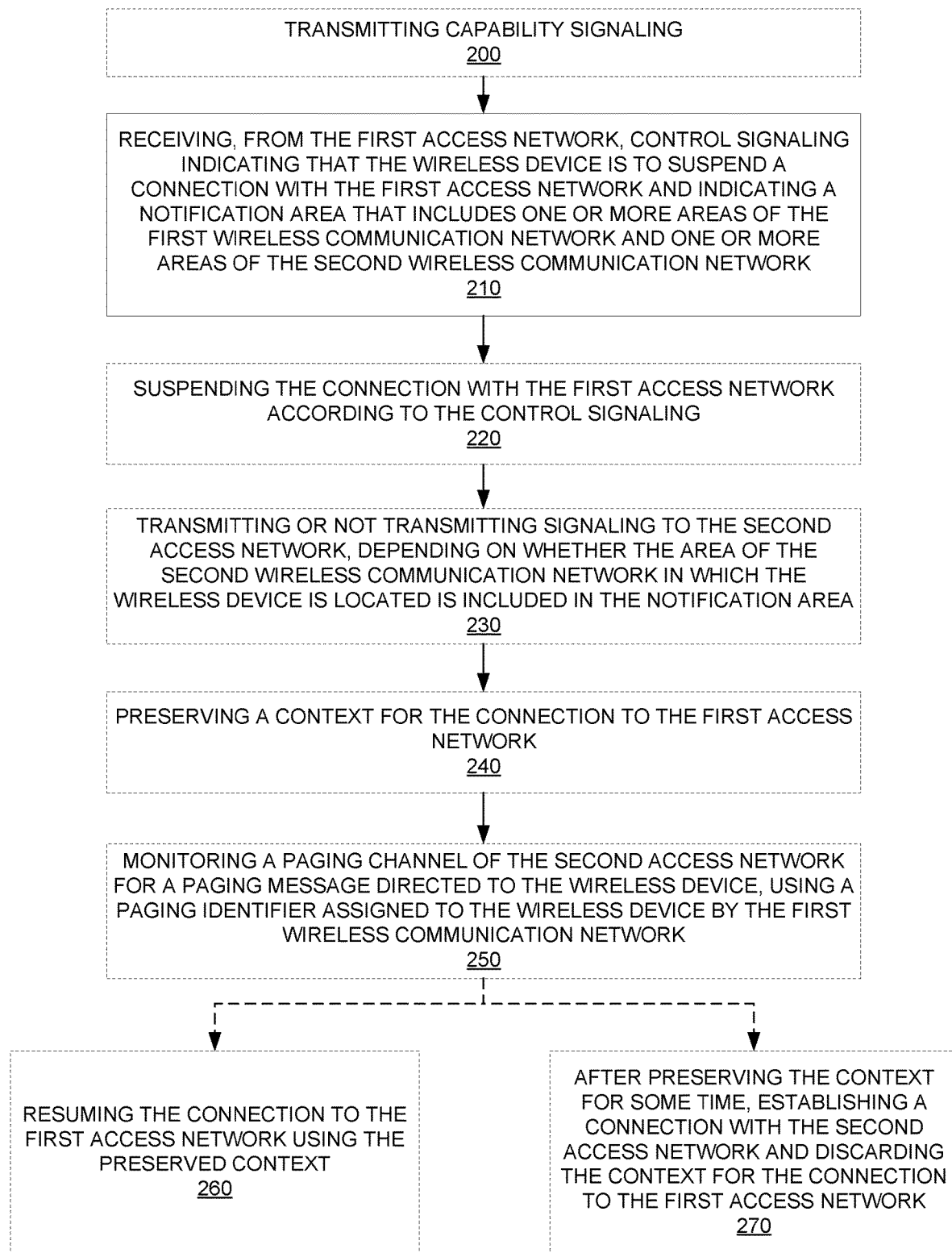
FIG. 2 is a logic flow diagram of a method performed by a wireless device according to some embodiments.

In view of the above modifications and variations, FIG. 2 depicts a method performed by a wireless device 16 in accordance with particular embodiments. The wireless device 16 is configured to operate in first and second access networks 12A, 12B. The first and second access networks 12A, 12B respectively provide access to first and second core networks 14A, 14B of different types. A first wireless communication network 10A comprises the first access network 12A (e.g., NR) and the first core network 14A (e.g., 5G Core, 5GC). A second wireless communication network 10B comprises the second access network 12B (e.g., LTE or E-UTRAN) and the second core network 14B (e.g., EPC). In some embodiments, the first wireless communication network 10A supports suspension of a connection 18 between a wireless device 16 and the first access network 12A, but the second wireless communication network 10B does not support suspension of a connection between a wireless device 16 and the second access network.

Regardless, the method includes receiving control signaling 22 (e.g., RRC signaling) from the first access network 12A (Block 210). The control signaling 22 may consist of one or more control messages. The control signaling in some embodiments indicates that the wireless device 16 is to suspend a connection 18 (e.g., an RRC connection) with the first access network 12A. The control signaling 22 alternatively or additionally in some embodiments indicates a notification area 24 (e.g., a RAN Notification Area, RNA). The notification area 24 in some embodiments is an area within which the wireless device 16 is allowed to move without notifying either of the first and second wireless communication networks 10A, 10B. Regardless, the control signaling 22 according to embodiments herein indicates the notification area includes one or more areas of the first wireless communication network 10A and one or more areas of the second wireless communication network 10B.

In some embodiments, the one or more areas of the first wireless communication network 10A include or cover one or more cells of the first access network and/or the one or more areas of the second wireless communication network 10B include or cover one or more cells of the second access network. In other embodiments, the one or more areas of the first wireless communication network 10A include or cover one or more radio access network, RAN, areas of the first access network, and/or the one or more areas of the second wireless communication network 10B include or cover one or more RAN areas of the second access network. In this case, each RAN area of the first access network is or is a subset of a tracking area of the first core network, and each RAN area of the second access network is or is a subset of a tracking area of the second core network.

In any event, in some embodiments as shown, the method may also include suspending the connection 18 with the first access network according to the control signaling 22 (Block 220). Alternatively or additionally, the method may further include transmitting or not transmitting to the second access network 12B signaling 26 indicating that the wireless device 16 is in an area 24B (e.g., a cell) of the second wireless communication network 10B (or that the wireless device 16 requests a connection to the second access network), depending on whether the area 24B of the second wireless communication network 10B in which the wireless device 16 is located is included in the notification area 24 (Block 230). For example, such transmitting or not transmitting may be performed upon the wireless device 16 entering, camping in, or moving into the area of the second wireless communication network. Or, such transmitting or not transmitting may be performed upon the wireless device 16 entering, camping in, moving into, or selecting a cell that is or is included in the area of the second wireless communication network. In any event, where the area is included in the notification area 24, then, this may mean that the device does not transmit such signaling 26 to the second access network node 20B.

In some embodiments, said transmitting or not transmitting comprises transmitting or not transmitting the signaling, depending respectively on whether the area is not included or is included in the notification area. Alternatively or additionally, said transmitting or not transmitting comprises: if the area is not included in the notification area, transmitting the signaling upon expiry of a timer; or refraining from transmitting the signaling if either: the area is included in the notification area; or the area is not included in the notification but the timer does not expire. In this case, the method may further comprise starting the timer upon the wireless device entering, camping in, or moving into the area of the second wireless communication network.

Alternatively or additionally, said transmitting or not transmitting may comprise transmitting or not transmitting the signaling, also depending on whether the area supports paging the wireless device on a paging channel of the second access network, using a paging identifier assigned to the wireless device by the first wireless communication network.

In some embodiments, the method also includes preserving a context for the connection 18 to the first access network, e.g., even after the device is located in (e.g., camped in) the area of the second wireless communication network 10B (Block 240). In these and other embodiments, then, the device 16 may monitor a paging channel of the second access network for a paging message directed to the wireless device 16, using a paging identifier assigned to the wireless device 16 by the first wireless communication network 10A, e.g., by the first core network or by the first access network 12A (Block 250). In any event, having preserved the context, the wireless device 16 in some embodiments may at some point thereafter resume the connection 18 to the first access network 12A using the preserved context (Block 260). Or, if after preserving the context for some time the device establishes a connection with the second access network 12B, the device 16 may then discard the context for the connection 18 to the first access network (Block 270).

In some embodiments not shown, the method may further comprise receiving a paging message on the monitored paging channel. Responsive to receiving the paging message, the method may comprise transmitting to the second access network signaling indicating that the wireless device 16 is in an area of the second wireless communication network 12 or that the wireless device 16 requests a connection to the second access network 12A.

In some embodiments, the method also includes transmitting capability signaling (Block 200). The capability signaling may indicate the wireless device 16 supports a notification area that includes one or more areas of the first wireless communication network 10A and one or more areas of the second wireless communication network.

In some embodiments, the first access network and the second access network are each a Long Term Evolution, LTE, access network or an Evolved UMTS Terrestrial Radio Access Network, E-UTRAN.

In some embodiments, the control signaling 22 is radio resource control, RRC, signaling.

In some embodiments, the control signaling 22 is included in an RRC release message.

In some embodiments, the control signaling 22 indicates the one or more areas of the first wireless communication network using a subset of area identifiers reserved for the first wireless communication network and indicates the one or more areas of the second wireless communication network using a subset of area identifiers reserved for the second wireless communication network.

In some embodiments, the control signaling 22 includes a sequence of one or more area identity information elements, wherein a subset of possible values of an area identity information element is reserved for indicating areas of the first wireless communication network and a different subset of possible values of an area identity information element is reserved for indicating areas of the second wireless communication network.

In some embodiments, the control signaling 22 indicates the one or more areas of the first wireless communication network and the one or more areas of the second wireless communication network in separate lists of areas dedicated to the first and second wireless communication networks, respectively.

In some embodiments, the method further comprises receiving system information on a broadcast channel of the second access network indicating a code associated with an area of the second access network whose coverage overlaps the area of the first access network.

In some embodiments, the control signaling 22 is non-access stratum, NAS, signaling.

In some embodiments, the method further comprises transmitting capability signaling indicating the wireless device supports a notification area that includes one or more areas of the first wireless communication network and one or more areas of the second wireless communication network.

In some embodiments, the first wireless communication network supports suspension of a connection between a wireless device and the first access network, and the second wireless communication network does not support suspension of a connection between a wireless device and the second access network.

Figure 3:
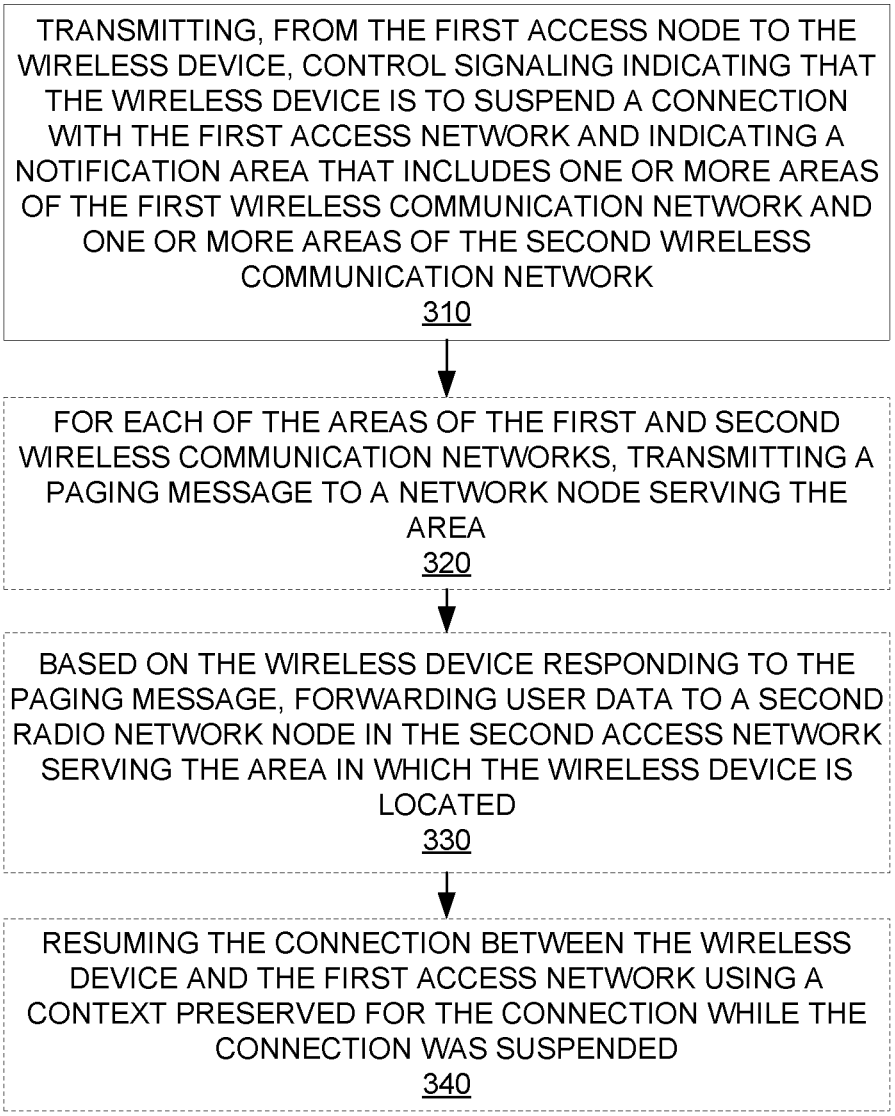
FIG. 3 is a logic flow diagram of a method performed by a first access node according to some embodiments.

FIG. 3 depicts a method performed by a first radio access node 20A of a first access network (e.g., NR) in accordance with other particular embodiments. A first wireless communication network 10A comprises the first access network and a first core network (e.g., 5GC) to which the first access network provides access. A second wireless communication network comprises a second access network (e.g., LTE or E-UTRAN) and a second core network (e.g., EPC) to which the second access network provides access. The first and second core networks are of different types. In some embodiments, the first wireless communication network 10A supports suspension of a connection between a wireless device 16 and the first access network, but the second wireless communication network does not support suspension of a connection between a wireless device 16 and the second access network.

Regardless, the method includes transmitting control signalling 22 from the first access node 20A to the wireless device 16 (Block 310). The control signaling 22 in some embodiments indicates that the wireless device 16 is to suspend a connection (e.g., an RRC connection) with the first access network. The control signaling 22 alternatively or additionally in some embodiments indicates a notification area 24 (e.g., a RAN Notification Area, RNA). The notification area in some embodiments is an area within which the wireless device 16 is allowed to move without notifying either of the first and second wireless communication networks. Regardless, the control signaling 22 according to embodiments herein indicates the notification area includes one or more areas of the first wireless communication network 10A and one or more areas of the second wireless communication network.

In some embodiments, the one or more areas of the first wireless communication network 10A include or cover one or more cells of the first access network and/or the one or more areas of the second wireless communication network include or cover one or more cells of the second access network. In other embodiments, the one or more areas of the first wireless communication network 10A include or cover one or more radio access network, RAN, areas of the first access network, and/or the one or more areas of the second wireless communication network include or cover one or more RAN areas of the second access network. In this case, each RAN area of the first access network is or is a subset of a tracking area of the first core network, and each RAN area of the second access network is or is a subset of a tracking area of the second core network.

Regardless, the method as shown may also include, for each of the areas of the first and second wireless communication networks, transmitting a paging message to a network node serving the area (Block 320). In some embodiments, the paging message is based on a paging identifier assigned to the wireless device 16 by the first wireless communication network 10A. In some embodiments, the paging identifier is assigned by the first core network. In other embodiments, the paging identifier is assigned by the first access network. This transmitting in some embodiments may comprise, for at least one area of the second wireless communication network, transmitting a paging message to a radio network node serving the area, where the paging message is based on the paging identifier. Regardless, the method may further include based on the wireless device 16 responding to the paging message, forwarding user data to a second radio network node in the second access network serving an area in which the wireless device 16 is located (Block 330).

In other embodiments, such as where the device engages in mobility to the second access network and then back to the first access network, the method may include resuming the connection between the wireless device 16 and the first access network using a context preserved for the connection while the connection was suspended (Block 340).

In some embodiments, the method further comprises receiving, from each of one or more network nodes serving the one or more areas of the second wireless communication network, capability signaling indicating that the network node supports paging from the first wireless communication network.

In some embodiments, the method further comprises receiving, from each of one or more network nodes serving the one or more areas of the second wireless communication network, signaling indicating an area of the second wireless communication network that the network node serves.

In some embodiments, the first access network and the second access network are each a Long Term Evolution, LTE, access network or an Evolved UMTS Terrestrial Radio Access Network, E-UTRAN.

In some embodiments, the control signaling 22 is radio resource control, RRC, signaling.

In some embodiments, the control signaling 22 is included in an RRC release message.

In some embodiments, the control signaling 22 indicates the one or more areas of the first wireless communication network using a subset of area identifiers reserved for the first wireless communication network and indicates the one or more areas of the second wireless communication network using a subset of area identifiers reserved for the second wireless communication network.

In some embodiments, the control signaling 22 includes a sequence of one or more area identity information elements, wherein a subset of possible values of an area identity information element is reserved for indicating areas of the first wireless communication network and a different subset of possible values of an area identity information element is reserved for indicating areas of the second wireless communication network.

In some embodiments, the control signaling 22 indicates the one or more areas of the first wireless communication network and the one or more areas of the second wireless communication network in separate lists of areas dedicated to the first and second wireless communication networks, respectively.

In some embodiments, the control signaling 22 is non-access stratum, NAS, signaling.

In some embodiments, the method further comprises receiving capability signaling indicating the wireless device supports a notification area that includes one or more areas of the first wireless communication network and one or more areas of the second wireless communication network.

In some embodiments, the first wireless communication network supports suspension of a connection between a wireless device and the first access network, and the second wireless communication network does not support suspension of a connection between a wireless device and the second access network.

Figure 4:
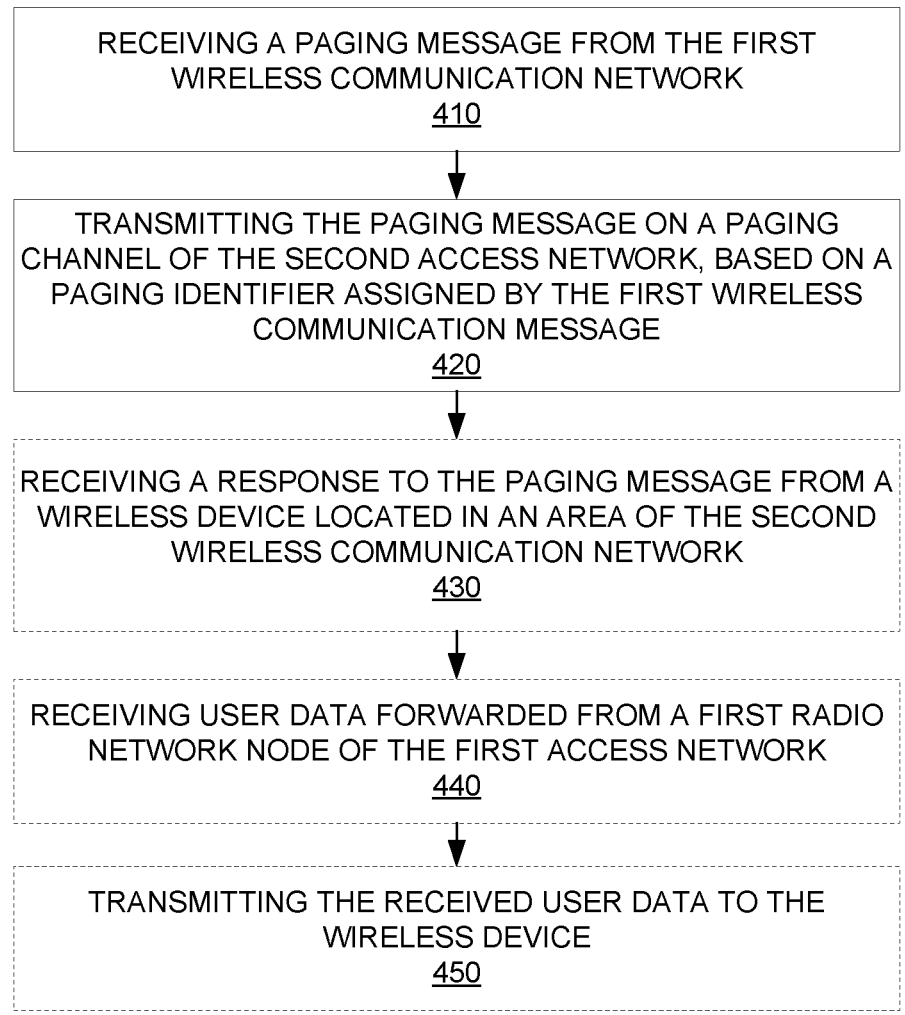
FIG. 4 is a logic flow diagram of a method performed by a second access node according to some embodiments.

FIG. 4 depicts a method for facilitating paging of a wireless device 16 from a first wireless communication network 10A via a second wireless communication network in accordance with other particular embodiments. The first wireless communication network 10A comprises a first access network (e.g., an NR network) and a first core network (e.g., 5GC) to which the first access network provides access. The second wireless communication network comprises a second access network (e.g., LTE or E-UTRAN) and a second core network (e.g., EPC) to which the second access network provides access. The first and second core networks are of different types. In some embodiments, the first wireless communication network 10A supports suspension of a connection between a wireless device 16 and the first access network, but the second wireless communication network does not support suspension of a connection between a wireless device 16 and the second access network.

Regardless, the method is performed by a second access node in the second access network and includes receiving a paging message from the first wireless communication network 10A (Block 410). The method further includes transmitting the paging message on a paging channel of the second access network, based on a paging identifier assigned by the first wireless communication message (Block 420). In some embodiments, the paging identifier is assigned by the first core network. In other embodiments, the paging identifier is assigned by the first access network.

In some embodiments, the method further includes receiving a response to the paging message from a wireless device 16 located in an area of the second wireless communication network (Block 430), receiving user data forwarded from a first radio network node of the first access network (Block 440), and transmitting the received user data to the wireless device 16 (Block 450).

In some embodiments, the method further includes transmitting to a first radio network node of the first access network, signaling indicating an area of the second wireless communication network that the second access node serves.

In some embodiments, the method further includes transmitting to a first radio network node of the first access network, signaling indicating the second access node supports paging from the first wireless communication network In some embodiments, the first access network and the second access network are each a Long Term Evolution, LTE, access network or an Evolved UMTS Terrestrial Radio Access Network, E-UTRAN.

In some embodiments, the first wireless communication network supports suspension of a connection between a wireless device and the first access network, and the second wireless communication network does not support suspension of a connection between a wireless device and the second access network.

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 5:
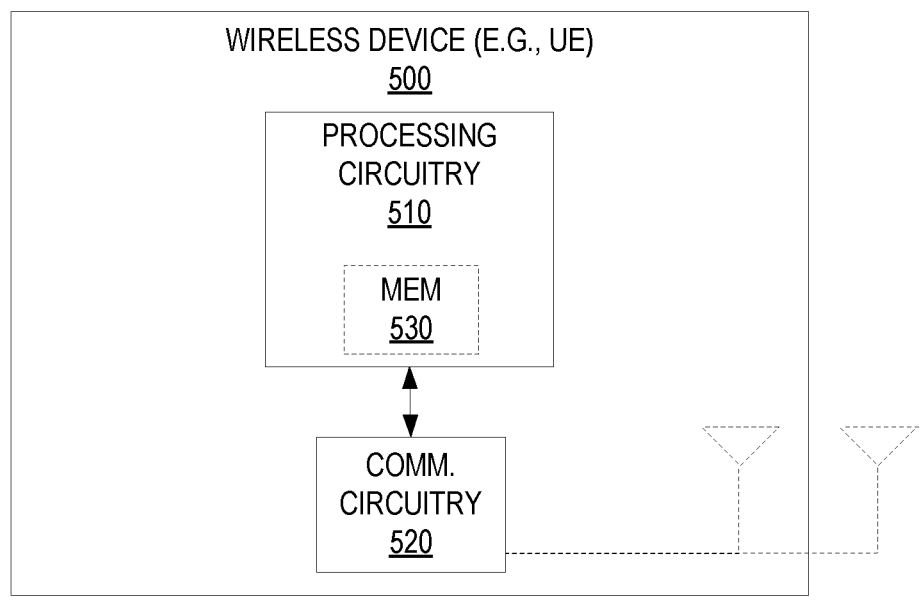
FIG. 5 is a block diagram of a wireless device according to some embodiments.

FIG. 5 for example illustrates a wireless device 500 (e.g., wireless device 16) as implemented in accordance with one or more embodiments. As shown, the wireless device 500 includes processing circuitry 510 and communication circuitry 520. The communication circuitry 520 (e.g., radio circuitry) is configured to transmit and/or receive information to and/or from one or more other nodes, e.g., via any communication technology. Such communication may occur via one or more antennas that are either internal or external to the wireless device 500. The processing circuitry 510 is configured to perform processing described above, e.g., in FIG. 2, such as by executing instructions stored in memory 530. The processing circuitry 510 in this regard may implement certain functional means, units, or modules.

Figure 6:
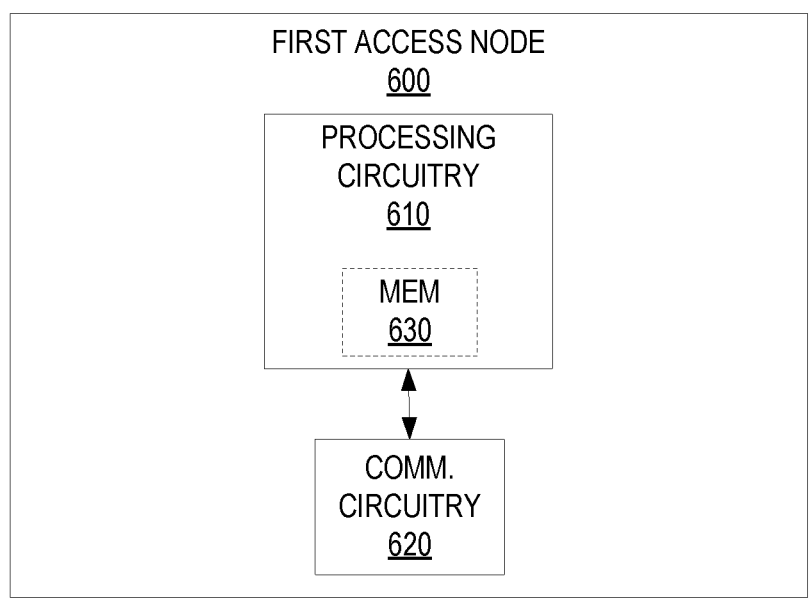
FIG. 6 is a block diagram of a first access node according to some embodiments.
Figure 7:
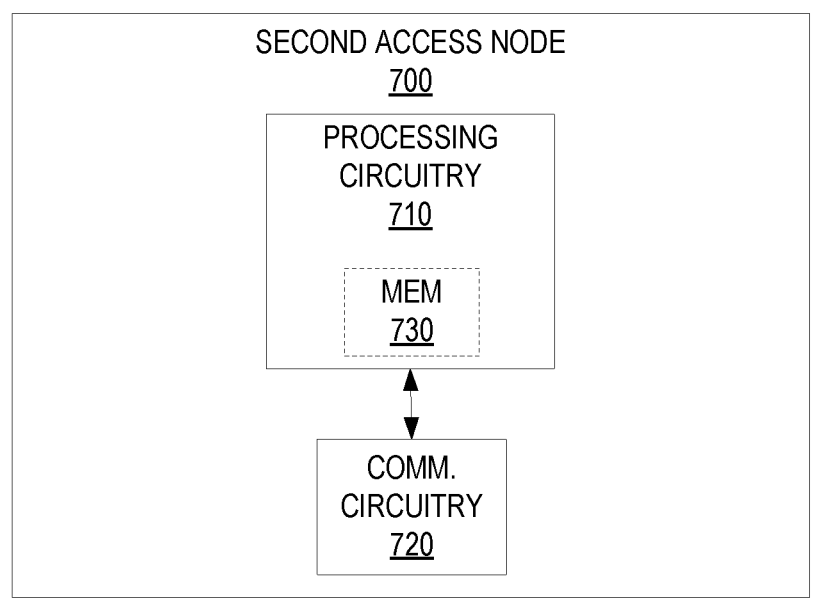
FIG. 7 is a block diagram of a second access node according to some embodiments.

FIG. 6 illustrates a first access node 600 (e.g., first access node 20A) as implemented in accordance with one or more embodiments. As shown, the first access node 600 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIG. 3, such as by executing instructions stored in memory 630. The processing circuitry 610 in this regard may implement certain functional means, units, or modules.

FIG. 6 illustrates a second access node 700 (e.g., second access node 20B) as implemented in accordance with one or more embodiments. As shown, the second access node 700 includes processing circuitry 710 and communication circuitry 720. The communication circuitry 720 is configured to transmit and/or receive information to and/or from one or more other nodes, e.g., via any communication technology. The processing circuitry 710 is configured to perform processing described above, e.g., in FIG. 4, such as by executing instructions stored in memory 730. The processing circuitry 710 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 8:
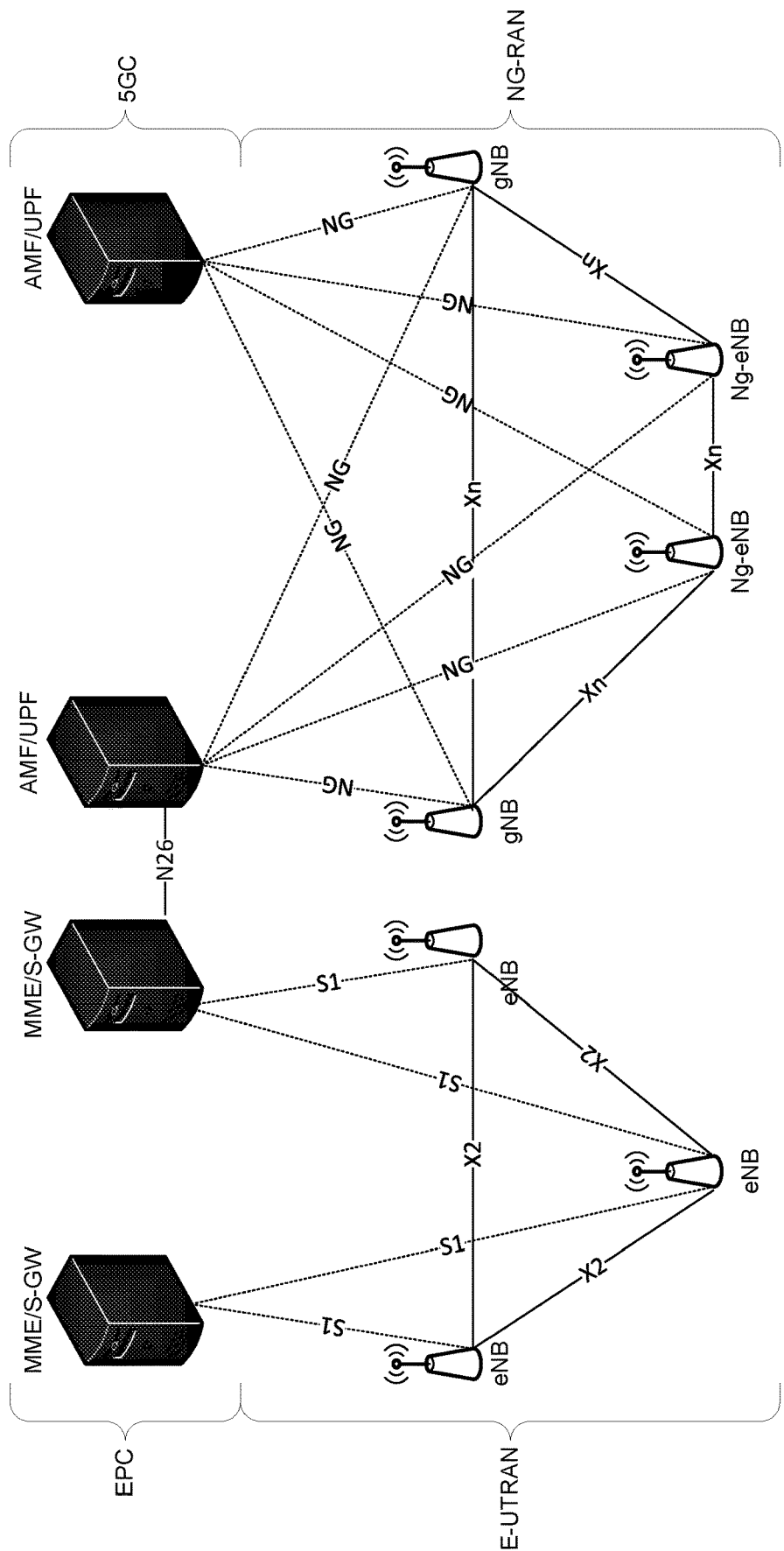
FIG. 8 is a block diagram of a network architecture for the Evolved Packet System (EPS) and 5$^{th}$ Generation System (5GS) according to some embodiments.

3GPP has decided to introduce both a new core network (5GC) and a new Radio Access Technology (NR) in the 5G system (5GS). However, the core network, 5GC, will also support other Radio Access Technologies (RATs) than New Radio (NR), namely Evolved UMTS Terrestrial Radio Access (E-UTRA). FIG. 8 shows the network architecture for the Evolved Packet System (EPS) and 5GS. As shown, E-UTRAN comprises Long Term Evolution (LTE) nodes (eNBs) connected to the Evolved Packet Core (EPC), and the Next Generation Radio Access Network (NG-RAN) comprising LTE nodes (ng-eNB) and NR nodes (gNB) connected to the 5G Core (5GC).

The LTE node connected to EPC (LTE/EPC) can be interconnected with the X2 interface, while the NG-RAN nodes (NR and LTE/5GC) can be interconnected with the Xn interface. 3GPP has also introduced an interface between the Mobility Management Entity (MME) in EPC and the Access and Mobility Function (AMF) in 5GC called N26, which enables interworking between EPC and 5GC.

Figure 9:
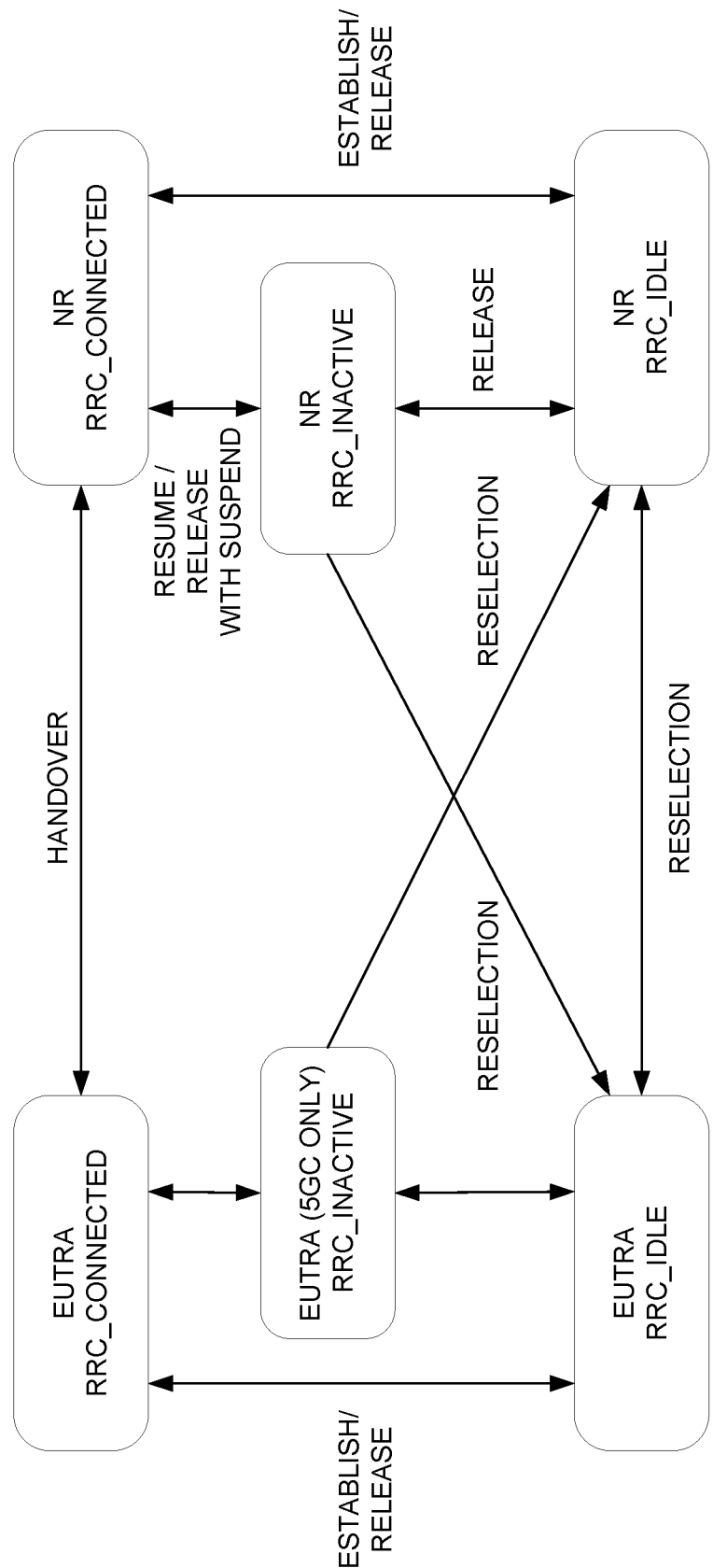
FIG. 9 is a block diagram of a UE state machine showing state transitions between NR/5GC, E-UTRA/EPC and E-UTRA/5GC.

Currently in LTE (E-UTRA) connected to EPC or 5GC and NR, the state transitions shown in FIG. 9 are supported. FIG. 9 in this regard shows a UE state machine and state transitions between NR/5GC, E-UTRA/EPC and E-UTRA/5GC. The RRC_INACTIVE state and the associated state transitions are only available for NR/5GC and E-UTRA/5GC.

As can be seen, it is possible to move an ongoing UE connection (UE is in RRC_CONNECTED) between the two RATs using a handover procedure. Additionally (not shown) it is possible for the network to move the UE to the other RAT by sending a Release message with re-direct information. When the UE is in IDLE or INACTIVE state, the cell reselection procedure will be used when transitioning between the RATs.

In addition, FIG. 9 shows the new RRC state RRC_INACTIVE introduced in Rel-15 for both NR and LTE/5GC. In RRC_INACTIVE, the UE stores certain configurations, e.g. data radio bearer (DRB) configurations and physical layers parameters. When the UE need to resume the connection, it transmits a RRCConnectionResumeRequest or RRCResumeRequest in LTE and NR respectively. The UE can then reuse the stored settings and reduce the time and signaling needed to properly operate in RRC_CONNECTED (as in RRC_INACTIVE security and CN connection are restored upon resume).

Note that, in NR, an equivalent message exists for the case of long I-RNTI of 40 bits used as UE identifier RRCResumeRequest1, associated to a different logical channel compared to the short I-RNTI used in the RRCResumeRequest message.

In Rel-15 (first release) of the NG-RAN standard, it has been agreed to not support direct transition between RRC_INACTIVE in LTE/5GC and RRC_INACTIVE in NR. Hence, a Rel-15 UE in RRC_INACTIVE in one RAT performing cell reselection to the other RAT would trigger the UE to release its access stratum (AS) context, enter RRC_IDLE and perform a Registration Area Update.

To suspend a UE from RRC_CONNECTED to RRC_INACTIVE, the source node prepares an RRCRelease (in NR) message which contain configurations for the RRC_INACTIVE state. In NR, this message is the RRCRelease message with the suspendConfig which contains configurations for a RAN Notification Area (RNA), which can either consists of a list of cells, or a list of RAN Area configurations comprising a tracking area code (TAC) and possibly including a list of RAN Area Codes (RANACs).

This is encoded in RRC NR as follows:

```
RAN-NotificationAreaInfo ::=       CHOICE {
   cellList              PLMN-RAN-AreaCellList,
   ran-AreaConfigList             PLMN-RAN-AreaConfigList,
   ...
}
```

First, there is the option between cellist or ran-AreaConfigList. In the case of cell list, there is the possibility to signal a common public land mobile network (PLMN) for a list of cells, or different PLMNs per cell.

```
PLMN-RAN-AreaCellList ::=        SEQUENCE (SIZE (1..
                                  maxPLMNIdentities)) OF
PLMN-RAN-AreaCell
PLMN-RAN-AreaCell ::=            SEQUENCE {
   plmn-Identity                 PLMN-Identity
OPTIONAL,  -- Need S
   ran-AreaCells                 SEQUENCE (SIZE (1..32)) OF
                                  CellIdentity
}
```

And, each RAN area configuration in the list has a TAC. Hence, the network may configure the UE with a list of TAI (Tracking Area Identifiers=TAC+PLMN) or a list of RAN area identifiers where each RAN Area Identifier is comprised by a TAC+RANAC.

```
PLMN-RAN-AreaConfigList ::=       SEQUENCE (SIZE
                                   (1..maxPLMNIdentities)) OF
PLMN-RAN-AreaConfig
PLMN-RAN-AreaConfig ::=           SEQUENCE {
   plmn-Identity                  PLMN-Identity
OPTIONAL,   -- Need S
   ran-Area                       SEQUENCE (SIZE (1..16)) OF
                                   RAN-AreaConfig
}
RAN-AreaConfig ::=                SEQUENCE {
   trackingAreaCode              TrackingAreaCode,
   ran-AreaCodeList              SEQUENCE (SIZE (1..32)) OF
                                   RAN-AreaCode
OPTIONAL   -- Need R
}
```

Whenever a UE in RRC_INACTIVE reselects to a new cell, based on measurements, the UE checks whether the target cell belong to the configured RNA by checking the system information (namely, system information block #1, SIB1) from the target cell. If the SIB1 contains the cell Identity or the RAN Area Code (RANAC) included in the RNA list of cells or RAN Area Codes respectively, the UE will remain in RRC_INACTIVE without performing any signaling. Since the RAN is aware that the UE is configured with a set of cells/RANACs, the UE doesn't need to inform the network as long as it remains within the RNA. If the network needs to page the UE, e.g. due to incoming downlink (DL) data or a voice call, the core network will address the source node (which suspended the UE) and the source node may perform a RAN paging across the cells inside the RNA. In the case the RNA is made up of cells belonging to different RAN nodes, the source RAN node will send an Xn page message to the other RAN nodes serving the RNA so that these RAN nodes can page within their own cells. Since the RAN node only pages in the RNA, it is important for the RAN to know when the UE moves outside the configured RNA configuration for reachability reasons.

However, if the UE reselects to a target cell which does not belong to the RNA configuration at the UE (based on cell Id or TAC/RANAC), the UE will either perform a RAN Area Update, i.e. transmit a Resume Request like message (RRCResumeRequest/RRCResumeRequest1 with the Resume-Cause value ranAreaUpdate) or perform a non-access stratum (NAS) procedure (e.g. Tracking/Registration Area Update) by transmitting a Resume message with the ResumeCause in accordance with the NAS message (this occurs in case the UE leaves a cell and enters both a new RAN area and new registration area). In either case, the network will decide upon reception of the Resume Request message whether to keep the UE in RRC_CONNECTED, or to release the UE back to RRC_INACTIVE with updated configurations or to release the UE to RRC_IDLE (other options are also possible e.g. reject the UE with wait time, in case of overload).

RRC Release Message in NR

As can be seen in the message below, the RRCRelease message in NR contain a suspendConfig information element (IE). The suspendConfig comprise a RAN notification Area (RNA) configuration which comprise either a list of cells, or a list of RAN Area Codes (RANACs), which may also be a list of tracking areas.

| RRCRelease message |
|---|

```
-- ASN1START
-- TAG-RRCRELEASE-START
RRCRelease ::=                          SEQUENCE {
    rrc-TransactionIdentifier               RRC-TransactionIdentifier,
    criticalExtensions                      CHOICE {
        rrcRelease                              RRCRelease-IEs,
        criticalExtensionsFuture                    SEQUENCE { }
    }
}
RRCRelease-IEs ::=                      SEQUENCE {
    redirectedCarrierInfo                   RedirectedCarrierInfo
OPTIONAL,    -- Need N
    cellReselectionPriorities               CellReselectionPriorities
OPTIONAL,    -- Need R
    suspendConfig                           SuspendConfig
OPTIONAL,    -- Need R
    deprioritisationReq                     SEQUENCE {
        deprioritisationType                    ENUMERATED {frequency, nr},
        deprioritisationTimer                   ENUMERATED {min5, min10, min15, min30}
    }                                               OPTIONAL,
-- Need N
    lateNonCriticalExtension                OCTET STRING
OPTIONAL,
    nonCritical Extension                   SEQUENCE { }
OPTIONAL
}
RedirectedCarrierInfo ::=           CHOICE {
    nr                          CarrierInfoNR,
    eutra                       RedirectedCarrierInfo-EUTRA,
    ...
}
RedirectedCarrierInfo-EUTRA ::=             SEQUENCE {
    eutraFrequency                      ARFCN-ValueEUTRA,
    cnType-r15                      ENUMERATED {epc,fiveGC}
OPTIONAL
}
CarrierInfoNR ::=           SEQUENCE {
    carrierFreq                 ARFCN-ValueNR,
    ssbSubcarrierSpacing                    SubcarrierSpacing,
    smtc            SSB-MTC
OPTIONAL,    -- Need S
    ...
}
SuspendConfig ::=               SEQUENCE {
    fullI-RNTI              I-RNTI-Value,
    shortI-RNTI             ShortI-RNTI-Value,
    ran-PagingCycle             PagingCycle,
    ran-NotificationAreaInfo            RAN-NotificationAreaInfo
OPTIONAL,    -- Need M
    t380            PeriodicRNAU-TimerValue
OPTIONAL,    -- Need R
    nextHopChainingCount                    NextHopChainingCount,
    ...
}
PeriodicRNAU-TimerValue ::=             ENUMERATED { min5, min10, min20, min30,
min60, min120, min360, min720}
CellReselectionPriorities ::=           SEQUENCE {
    freqPriorityListEUTRA                   FreqPriorityListEUTRA
OPTIONAL,    -- Need M
    freqPriorityListNR              FreqPriorityListNR
OPTIONAL,    -- Need M
    t320            ENUMERATED {min5, min10, min20, min30, min60,
min120, min180, spare1}     OPTIONAL,    -- Need R
    ...
}
PagingCycle ::=             ENUMERATED {rf32, rf64, rf128, rf256}
FreqPriorityListEUTRA ::=           SEQUENCE (SIZE (1..maxFreq)) OF
FreqPriorityEUTRA
FreqPriorityListNR ::=          SEQUENCE (SIZE (1..maxFreq)) OF FreqPriorityNR
FreqPriorityEUTRA ::=           SEQUENCE {
    carrierFreq             ARFCN-ValueEUTRA,
    cellReselectionPriority             CellReselectionPriority,
    cellReselectionSubPriority              CellReselectionSubPriority
OPTIONAL    -- Need R
}
FreqPriorityNR ::=          SEQUENCE {
    carrierFreq             ARFCN-ValueNR,
    cellReselectionPriority             CellReselectionPriority,
    cellReselectionSubPriority              CellReselectionSubPriority
```

-continued

```
                            RRCRelease message
OPTIONAL  -- Need R
}
RAN-NotificationAreaInfo ::=         CHOICE {
   cellList                  PLMN-RAN-AreaCellList,
   ran-AreaConfigList            PLMN-RAN-AreaConfigList,
   ...
}
PLMN-RAN-AreaCellList ::=            SEQUENCE (SIZE (1.. maxPLMNIdentities)) OF
PLMN-RAN-AreaCell
PLMN-RAN-AreaCell ::=          SEQUENCE {
   plmn-Identity        PLMN-Identity
OPTIONAL, -- Need S
   ran-AreaCells           SEQUENCE (SIZE (1..32)) OF CellIdentity
}
PLMN-RAN-AreaConfigList ::=          SEQUENCE (SIZE (1..maxPLMNIdentities)) OF
PLMN-RAN-AreaConfig
PLMN-RAN-AreaConfig ::=          SEQUENCE {
   plmn-Identity        PLMN-Identity
OPTIONAL, -- Need S
   ran-Area            SEQUENCE (SIZE (1..16)) OF RAN-AreaConfig
}
RAN-AreaConfig ::=              SEQUENCE {
   trackingAreaCode       TrackingAreaCode,
   ran-AreaCodeList       SEQUENCE (SIZE (1..32)) OF RAN-AreaCode
OPTIONAL  -- Need R
}
-- TAG-RRCRELEASE-STOP
-- ASN1STOP
```

Consider now inter-RAT mobility when the UEs are in RRC_IDLE and/or RRC_INACTIVE.

An RRC_IDLE UE in NR, upon reselecting to an LTE cell, shall enter in RRC_IDLE in LTE. If the target LTE cell is connected to 5GC (5GC only), with only a 5GC TAC associated, that may either be part of the UE's TAI list or not. In other words, the UE may either trigger a Registration Area Update or not, depending whether the LTE cell is in its TAI list.

Heretofore, in the case the target cell is an LTE EPC only cell, on the other hand, that cell may not be on the UE's TAI list since the cells is served by a different core network. Furthermore, EPC NAS only supports a 16 bits TAC, while 5GC has a 24 bits TAC. In other words, upon entering RRC_IDLE in EPC, there will always be a Tracking Area Update. No paging between core network has heretofore been supported between 5GC and EPC.

In the case the target cell is both an LTE EPC and 5GC cell, as long as at least one of the TACs is in the UE's TAI list, there will be no Registration/Tracking Area Updates, i.e., no signalling.

In the case the UE is in RRC_INACTIVE in NR and performs inter-RAT cell reselection to an LTE cell, the UE heretofore shall always transition to RRC_IDLE in LTE, regardless if that is an LTE EPC only cell, or a LTE 5GC only cell or both LTE 5GC/EPC cell.
In the latest version of the 3GPP specifications, that is translated as follows:
5.3.13.Y Inter RAT cell reselection
Upon reselecting to an inter-RAT cell, the UE shall:
1> perform the actions upon going to RRC_IDLE as specified in 5.3.11, with release cause 'other'.

According to the 3GPP specifications, if the target LTE cell is connected to 5GC (i.e. same CN as the NR cell) and that has a TAC in the UE's TAI list, there will be no Registration Area Update. If the target LTE cell is only connected to EPC (i.e. different CN as the NR cell), regardless of its TAC, there will always be a Tracking Area Update.

There currently exist certain challenge(s). Initial deployments of NR radio access are likely to provide spotty coverage, meaning that there is a requirement to support (service) fall back to existing LTE systems to support service continuity. The need for fall back is applicable both for UEs with ongoing services and for UEs in a power saving state (e.g. RRC_IDLE, RRC_INACTIVE). If the fall back is between NR and LTE connected to EPC core network, the UE performing the fall back needs to perform a "registration update" (or tracking area update) to the EPC to update the UE "registration area" (or tracking area list), since if this is not performed the UE will be unreachable from the network. During this process, a UE context will be generated in the EPC, based on information provided by the UE and the source 5GC core network. Similarly, the UE would need to perform a new "registration update" (or tracking area update) when it moves back to 5GC.

Figure 10:
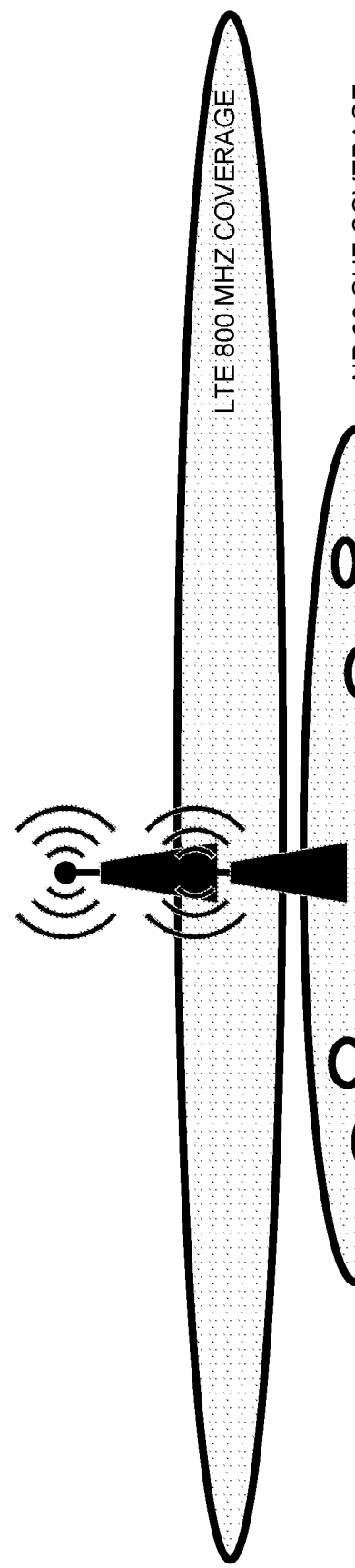
FIG. 10 is a block diagram of co-sited deployments of NR on 30 GHz (with coverage holes) and LTE on 800 MHz (without coverage holes).

For UEs located on the NR "cell border" these registrations could be quite frequent since the radio conditions can fluctuate based on the UE position and if there is anything blocking the signals (e.g. walls), which could be quite common in higher frequencies used by NR, etc. Frequent registration signalling could increase battery consumption, generate more network load and interference affecting other services. It should be noted here that the "cell border" can be anywhere within the NR cell where the coverage is spotty e.g. behind walls, in basements, . . . I.e. it is not just when the distance from the NR base station is too long. FIG. 10 shows an example of a co-sited deployments of NR on 30 GHz (with coverage holes) and LTE on 800 MHz (without coverage holes).

For UEs which are active, sending and/or receiving data, the registration signalling at inter-RAT transitions could be neglected since the UE is anyway involved in data transmission generating traffic load etc. But for UEs in a power saving state such as IDLE or INACTIVE, this signalling could significantly affect the battery consumption which in turn affects the stand-by time etc. Also, many more UEs are in power saving states than active state so the signalling load in the network from these UEs could be significant.

Several mechanisms reduce the signalling at inter-RAT and/or inter-System. Between LTE (4G) and HSPA (3G) a mechanism called ISR (inter-system signalling reduction) allows the UE to be registered to both 4G and 3G at the same time and in this way avoid further signalling when the UE toggles between LTE and HSPA. Unfortunately, this mechanism is quite complex requiring a lot of complexity in the EPC and 3G core network to maintain the dual contexts/registration. Also, in 5GC there is support for Dual Registration where the UE can be registered in the CN twice. This solution has similar complexities.

Between LTE connected to 5GC and NR connected to 5GC (i.e. inter-RAT, but single CN) mechanisms make it possible for the UEs in IDLE state to be assigned a registration area consisting of both LTE and NR cells. Furthermore, the 5GC will page the UE in both LTE and NR cells. This mechanism is enabled by the fact that the same core network is used for both LTE and NR. This mechanism requires to support LTE connected 5GC which is quite complex (requires re-implementation of existing LTE functionality) and is less likely to be supported in many networks.

Co-owned WO 2018/019362 introduces a mechanism for the UE to simultaneously camp in two RATs. These mechanisms also reduce the signalling needed for UEs which changes RAT in an inactive state. The solution however does not address the scenario where the two RATs are using different Core Networks without requiring dual registration.

A problem exists therefore in that every time the UE performs inter-RAT mobility between NR and LTE there will heretofore be signalling. A solution is needed for allowing the UE in a power saving state to move between LTE and NR without requiring signalling at every transition. The solution should support transitions between LTE connected to EPC and NR connected to 5GC since this is expected to be a very common deployment in the market, and it avoids the complexities to support LTE connected to 5GC. The solution should not require that the UE has double registration in the core network (as ISR, or 5G dual registration) due to the complexities to maintain the UE context in the two core networks e.g. when the context is updated on one side.

It is important to mention that in many markets the initial 5G deployments will comprise of LTE cells connected to EPC, and NR cells in non-standalone operation, working as boosters for UEs in E-UTRA NR dual connectivity (EN-DC). A likely migration step is that these NR cells are upgraded to also support standalone operation i.e. there will be LTE/EPC cells with overlapping coverage with NR cells that also support standalone (and possibly RRC_INACTIVE). Meanwhile, the migration from LTE/EPC to LTE/5GC could take longer. Hence, it is quite relevant to optimize the scenario where we have inter-RAT with different CNs, but inter-node connectivity.

Certain aspects of the present disclosure and their embodiments may provide solutions to these or other challenges. Some embodiments provide a mechanism for the UE to camp (in a power saving state) in both LTE/EPC and NR cells without performing signalling at the inter-RAT transition. Some embodiments are based on one or more of the following components.

As a first component, the UE is configured, by the network using radio signalling, with a RAN notification area consisting of both NR and LTE cells (or a set of cells such as Tracking Areas, RAN areas) where these cells may be associated to different CN nodes and/or CN types (e.g. 5GC and EPC). As part of the solution, the UE may be configured with lists of cells where elements may have different sizes and/or lists of TAIs where elements may have different sizes (e.g. in number of bytes).

As a second component, when the UE moves from NR to LTE/EPC (upon inter-RAT cell reselection) it does not need to perform any signalling as long as the target cells belong to the UE's configured RAN notification areas and/or CN registration area and the UE is in a power saving state.

The UE will monitor the paging channel(s) in the cell it is currently camping. If it receives a page with the identity it has been assigned from the NR RAN or from the CN it will leave the power saving state and perform signalling. If the UE for other reasons needs to send UL data or signalling, it will also leave the power saving state and perform signalling.

In case the UE is in an NR cell when it leaves the power saving state, it will perform the normal NR signalling procedure for UEs in RRC_INACTIVE (RRC Resume procedure).

In case the UE re-selects to an LTE/EPC cell inside the UE's configured RAN notification area, and the UE later becomes active while it is in LTE/EPC, the UE will perform an RRC Connection Setup and/or Tracking Area Update (or similar registration update) procedure to trigger the UE context relocation to EPC. The UE can also indicate in the tracking area update request message that it has data and/or signalling to transmit or that it is responding to a network page. When the network receives this indication, it can trigger the setup of the UE context (S1 UE context setup procedure) in the RAN, leading to the UE entering RRC_CONNECTED and sending/receiving data.

In case the UE re-selects to an NR cell outside the configured RAN notification area, the UE performs the normal NR signalling procedure for UEs performing location updates (e.g. RAN area update, Tracking area update).

In case the UE re-selects to an LTE/EPC cell outside the configured RAN notification area, the UE performs a Tracking Area Update (or similar registration update) to trigger the relocation to EPC. Another alternative is that in case the UE in INACTIVE state re-selects to an LTE/EPC cell outside the configured RAN notification area, the UE waits until it performs a follow up action such as: Tracking Area Update (or similar registration update) to trigger the relocation to EPC; Transition to IDLE (in case the UE is in INACTIVE state), possibly including an indication to higher layers. The action of "waiting" can be controlled by a timer that is started upon the inter-RAT cell reselection (e.g. to an area outside the UE's configured RAN area), stopped upon cell reselection to a cell within the UE's configured RAN area (e.g. either an LTE/EPC cell, LTE/5GC cell or NR cell), and, upon expiry, the UE perform at least one of the actions above (location updates, transition to IDLE, etc.).

Notice that what is referred to as an LTE/EPC cell may be a cell also capable of connecting to 5GC, which in that case the cell also broadcasts a 5GC TAC (24 bits). Hence, the UE entering the coverage of that cell may check both TACs/cell identifiers to verify if the UE is within the UE's configured RAN area. If at least one of the identifiers (5GC related or EPC related) are within the UE's configured RAN area, signalling can be avoided.

To support the UE components of this solution, one or more of the following mechanisms is introduced in the network in some embodiments. A first mechanism may be introduced to perform RAN paging from the NR RAN nodes to LTE RAN nodes. One option here is to perform this paging using the X2 interface which is supported between NR RAN nodes and LTE RAN nodes in order to support Dual Connectivity (EN-DC) for initial non-standalone NR deployments.

Mechanisms may also be introduced over the X2 interface for LTE RAN nodes to inform NR RAN nodes if they support paging to allow NR nodes to use this feature only with LTE RAN nodes that support it. This information may be added to the X2 setup signalling (X2 setup request, X2 setup response) or other signalling.

Mechanisms may also be introduced over the X2 interface for LTE RAN nodes to inform NR RAN nodes which cells, RAN areas, or Tracking Areas they support, to allow an NR node to assign UEs these areas. This information may be added to the X2 setup signalling (X2 setup request, X2 setup response) or other signalling.

Mechanisms may also be introduced over the X2 interface for NR RAN nodes to inform LTE RAN nodes that they support this feature. This information may be added to the X2 setup signalling (X2 setup request, X2 setup response) or other signalling.

Mechanisms may also be introduced over the X2 interface to support packet forwarding of packets in the DL from NR node performing the paging to ensure that if the UE is responding in LTE the packet that triggered the paging is not lost in NR RAN.

Mechanisms may also be introduced over the X2 interface to support packet forwarding in the UL if it is desired not to move the UE context to the LTE base station (e.g. in case UE only has a few packets to send).

In order to support legacy base stations not supporting this feature, some embodiments introduce an indication in the LTE system information broadcasted in the cell that the cell supports this feature. If the UE then enters a cell that does not support this feature, the UE may perform a tracking area update (or similar registration update).

As described above, on the network side, as the UEs may be configured with RAN areas which comprises lists of cells with cells from different CN types/nodes, or lists of TACs of TACs from different CN types/nodes, the method in some embodiments comprises the network paging the UE in TAs from different CN types/nodes e.g. EPC and 5GC.

In order to allow that not all UEs may support configuring both NR and LTE/EPC cells in the RNA, and to support the methods described herein, capability signalling may be introduced so that the network can know which UEs support this feature.

More generally, a UE according to some embodiments is configured with a RAN Notification Area comprising both LTE/EPC and NR cells (either with a list of cell identities or a list of Tracking Area Codes and/or RAN Area Codes) when released (or suspended) from NR RRC_CONNECTED to NR RRC_INACTIVE.

If the UE reselects to a cell inside the configured RNA, it remains in RRC_INACTIVE regardless of whether the cell belong to NR or LTE/EPC. If the UE later resumes in NR, it performs the normal resume procedures (RRC Resume, RAN area update or Tracking Area Update). If the UE later resumes in an LTE cell, it performs a fallback procedure by initiating a NAS level Tracking Area update procedure including the transmission of an RRCSetupRequest message to the target node. The Tracking Area update message can include an indication from the UE to the network that the UE has uplink (UL) data and/or signalling, or is responding to a page message. The UE will also monitor (RAN) paging messages while camping on an LTE cell.

To enable UE reachability in RRC_INACTIVE in an RNA with both NR and LTE/EPC cells, inter-system RAN paging and other signalling is introduced to the X2 interface. In addition, mechanisms are introduced to forward data from NR node to LTE node.

Certain embodiments may provide one or more of the following technical advantage(s). One advantage of some embodiments is that they avoid signalling for UEs in a power saving mode (e.g. RRC_IDLE or RRC_INACTIVE) moving between LTE and NR frequently in the same area. For UEs in RRC_INACTIVE in NR, signalling can be completely avoided if the UE transitions to LTE and then back to NR. For a UE in LTE IDLE state, signalling will be performed when the UE transitions to NR, but no signalling is required when the UE transitions back to LTE assuming the UE has entered RRC_INACTIVE in NR and then is assigned a RAN notification area including the LTE cell that the UE moves back to.

From the network perspective, it is possible to implement this solution in some embodiments by enhancing the existing 3GPP X2 interface defined and used between LTE/EPC and NR for supporting non-standalone NR deployments relying on dual connectivity with LTE (called EN-DC in 3GPP). This allows a smooth network migration from initial non-standalone NR deployments to NR standalone supporting this feature. In other words, the solution in some embodiments leverages the existence of an X2 interface between LTE and NR nodes primarily for EN-DC purpose, but now for signalling optimization for standalone UEs, in case these NR nodes are both EN-DC capable and Standalone capable. It is also possible to use alternative interfaces between the NR gNB and LTE eNB, or perform signalling via Core Network.

The solution in some embodiments is much less complex than deploying LTE connected to 5GC, or using a mechanism based on Dual Registration.

The solution in some embodiments can be supported without CN impacts. The CN will not need to be aware of that the UE moves to LTE until at the time the UE becomes active in LTE. By not having any CN impact, the solution is easier to deploy in existing networks.

The solution in some embodiments allows the UE to get optimized performance when in NR coverage since the UE can use the normal NR RRC_INACTIVE to RRC_CONNECTED transition which is associated with low latency access.

It is important to mention that overlapping coverage areas of LTE cells connected to EPC only and NR cells, initially deployed for EN-DC and later upgraded to support standalone operation, could be a quite common deployment, as that is a possible natural upgrade step after EN-DC only deployments. Hence, a solution to optimize signalling for that particular deployment is quite relevant.

Note that the solutions described herein are based on UE mobility in a sleep state (RRC_INACTIVE) between NR and LTE connected to EPC (LTE/EPC). However, in Rel-15, a corresponding sleep state was introduced in LTE connected to 5GC (LTE/5GC), where a UE can be configured with a list of LTE/5GC cells in a RAN notification area. Thus, the embodiments described herein can easily be extended to encompass mobility between LTE/5GC and LTE/EPC with similar signalling reductions.

Or, in more general terms, the method is applicable to any inter-RAT or intra-RAT scheme as described herein where the cells are connected to different CN types or nodes. For example, the UE may be configured with cells connected to EPC and cells connected to 5GC and perform cell reselection without triggering any signalling. And, upon cell reselection, monitoring paging channel. The term "different CN types or nodes" also comprises the case where the cell is connected to two different CN types, for example, an LTE cell connected to both EPC and 5GC.

The solutions described herein are covering the case when RAN (RRC) signalling is used to configure the RAN notification areas. It should however be noted that the same principles can be applied to cases when CN signalling (NAS) or other signalling is used to configure a UE registration area containing both LTE and NR cells or areas.

As described above, the RRC message transitioning a UE from RRC_CONNECTED to RRC_INACTIVE is the RRCRelease message with suspendConfig. This message will contain an RAN Notification Area configuration comprising either a list of cells (one or more), or a list of RAN Area configurations comprising Tracking Area Codes and zero or more RAN Area Codes. In the following sections, embodiments extending the cell list and RAN Area configuration list are discussed to include LTE/EPC cells in the RNA. Even though the solutions for extending the cell list and the RAN Area configuration list are presented separately, both solutions can be implemented separately or jointly.

Extending the RAN Notification Area cell list may be accomplished using one or more of the following embodiments:
  Extending the definition of NR CellIdentity to include LTE cells
  Extending the RAN Notification Area Info IE to include separate lists of NR and LTE cells
  Extending the RAN Notification Area Info IE to include a new list with both LTE and NR cells
  Extending the SuspendConfig IE to include a new RAN Notification Area IE comprising both LTE and NR cells or only LTE cells (in this case the original cell list is used for NR cells)

Extending the RAN Notification Area list of configurations may be accomplished using one or more of the following embodiments:
  Extending the definition of NR TAC to include LTE TACs
  Extending the RAN Notification Area configuration to include separate list of NR and LTE TACs or only LTE TACs (in this case the original RAN Notification Area configuration is used for NR TACs)
  Introducing LTE RANAC for LTE/EPC, i.e. broadcast the RANAC, either using same format as in LTE/5GC, or with a new format)
    allow LTE/EPC RANACS to be included in the RAN Notification Area Config list
    Introduce a new list of RANACs to be used for LTE/EPC cells.

Consider now the embodiments for extending RAN Notification Area cell list to include LTE cells. Since LTE/EPC does not support RRC_INACTIVE, one possibility is that LTE/EPC will not broadcast a RAN Area Code (RANAC) in system information (e.g. SIB1). Thus, one solution is to define the mixed RNA comprising of cells from both NR and LTE/EPC.

The current configuration of the cell list for the RNA in NR is specified as:

```
RAN-NotificationAreaInfo ::=        CHOICE {
    cellList            PLMN-RAN-AreaCellList,
    ran-AreaConfigList  PLMN-RAN-AreaConfigList,
```

-continued

```
    ...
}
PLMN-RAN-AreaCellList ::=       SEQUENCE (SIZE
                                (1.. maxPLMNIdentities)) OF
                                PLMN-RAN-AreaCell
PLMN-RAN-AreaCell ::=           SEQUENCE {
    plmn-Identity               PLMN-Identity
    OPTIONAL, -- Need S
    ran-AreaCells               SEQUENCE (SIZE (1..32)) OF
                                CellIdentity
}
```

However, the cell identity used in the cell list for the NR RNA is defined as:

CellIdentity information element in NR (TS 38.331 v15.3.0)

```
-- ASN1START
CellIdentity ::=        BIT STRING (SIZE (36))
-- ASN1STOP
```

Whereas a cell in LTE is defined by the LTE cell identity:

CellIdentity information element in E-UTRA (TS 36.331 v15.3.0)

```
-- ASN1START
CellIdentity ::=        BIT STRING (SIZE (28))
-- ASN1STOP
```

Notably, the CellIdentity in NR is 36 bits, whereas the CellIdentity in LTE is 28 bits.

In one embodiment, the LTE CellIdentity is padded from 28 bits to 36 bits, with e.g. 8 leading zeros. To enable this, the network planning of NR cell identities would require avoiding configuring any NR cell identity with 8 leading zeros. However, since the NR CellIdentity is 36 bits (approx. 68.7 billion values), while the LTE CellIdentity is only 28 bits (approx. 270 million values), restricting the range of NR cell identities would still allow for $2^{36}-2^{28}$ unique values (approx. 68.4 billion values) for the NR cell identities.

If the NR cell identities do not exclude the LTE cell identities, the UE could be configured with a RNA comprising a cell identity matching both an NR cell and an LTE cell, even though only one of the cells were intended. If the UE reselects to the other (non-intended) cell, the RAN would be unaware of the UE location, and the UE would be unreachable for paging.

In another embodiment, the RRCRelease message is extended to include a separate list for LTE cells in the RAN Notification Area configuration. Since the RAN-NotificationAreaInfo IE is an extendable CHOICE structure, one alternative is to add the inter-RAT RNA in that IE as shown by the following example:

```
RAN-NotificationAreaInfo ::=        CHOICE {
    cellList                        PLMN-RAN-AreaCellList,
    ran-AreaConfigList                  PLMN-RAN-AreaConfigList,
    ...
    [[ cellListinterRAT             PLMN-RAN-AreaCellListInterRAT,
    ]]
}
PLMN-RAN-AreaCellListInterRAT ::=            SEQUENCE (SIZE (1.. maxPLMNIdentities))
OF PLMN-RAN-AreaCellInterRAT
PLMN-RAN-AreaCellInterRAT ::=            SEQUENCE {
    plmn-Identity               PLMN-Identity
OPTIONAL, -- Need S
    ran-AreaCells                   SEQUENCE (SIZE (1..32)) OF CellIdentityInterRAT
}
CellIdentityInterRAT ::=            CHOICE {
    nr-Cell                 CellIdentity,
    eutra-Cell              BIT STRING ( SIZE (28))
}
```

In another embodiment, the suspendConfig IE is extended to include a separate LTE RNA configuration as shown by the following example:

```
SuspendConfig ::=               SEQUENCE {
    fullI-RNTI                  I-RNTI-Value,
    shortI-RNTI                 ShortI-RNTI-Value,
    ran-PagingCycle                 PagingCycle,
    ran-NotificationAreaInfo            RAN-NotificationAreaInfo
OPTIONAL, -- Need M
    t380                    PeriodicRNAU-TimerValue
OPTIONAL, -- Need R
    nextHopChainingCount            NextHopChainingCount,
    ...,
    [[ ran-NotificationAreaInfoEUTRA        RAN-NotificationAreaInfoEUTRA
OPTIONAL  -- Need M
    ]]
}
RAN-NotificationAreaInfoEUTRA ::=       CHOICE {
    plmn-RAN-AreaCellListEUTRA          PLMN-RAN-AreaCellListEUTRA,
    ...
}
PLMN-RAN-AreaCellListEUTRA ::=          SEQUENCE (SIZE (1.. maxPLMNIdentities))
OF PLMN-RAN-AreaCellEUTRA
PLMN-RAN-AreaCellInterRAT ::=           SEQUENCE {
    plmn-IdentityEUTRA              PLMN-Identity
OPTIONAL, -- Need S
    ran-AreaCellsEUTRA              SEQUENCE (SIZE (1..32)) OF
CellIdentityEUTRA
}
CellIdentityEUTRA ::=           BIT STRING (SIZE (28)),
```

In another embodiment, the SuspendConfig IE is extended to include a cell list comprising both LTE and NR cells.

Consider an example procedure to support inter-RAT RNAs where cells belong to different core networks.

5.3.13.8 RNA update

In RRC_INACTIVE state, the UE shall:
1> if T380 expires; or
1> if RNA Update is triggered at reception of SIB1, as specified in 5.2.2.4.2:
    2> initiate RRC connection resume procedure in 5.3.13.2 with resumeCause set to ma-Update;
1> if RNA Update is triggered at reception of SIB1, as specified in TS 36.331 [10] sub-clause 5.2.2.7:
    2> perform the actions for inter-RAT cell reselection as specified in sub clause 5.3.13.Y;
1> if barring is alleviated for Access Category '8', as specified in 5.3.14.4:
    2> if upper layers do not request RRC the resumption of an RRC connection, and
    2> if the variable pendingRnaUpdate is set to true:
        3> initiate RRC connection resume procedure in 5.3.13.2 with resumeCause value set to ma-Update.

If the UE in RRC_INACTIVE state fails to find a suitable cell and camps on the acceptable cell to obtain limited service as defined in TS 38.304 [20], the UE shall:
1> perform the actions upon going to RRC_IDLE as specified in 5.3.11 with release cause 'other'.

5.3.13.Y Inter RAT cell reselection

Upon reselecting to an inter-RAT cell, the UE shall:
1> perform the actions upon going to RRC_IDLE as specified in 5.3.11, with release cause 'other'.

Consider now extending a RAN Notification Area Configuration to include TACs or RANACs from LTE. In one embodiment, the definition of the RAN Notification Area configuration is extended to encompass also LTE cells. Since the RAN Notification Area is defined by both a Tracking Area Code (TAC) and a RAN Area Code (RANAC), the extension to include LTE cells can be based on extending either of these codes.

As is shown, the RRC message transitioning a UE from RRC_CONNECTED to RRC_INACTIVE is the RRCRelease message with suspendConfig.

As described before, since LTE/EPC does not support RRC_INACTIVE, one possibility is that LTE/EPC will not broadcast a RAN Area Code (RANAC) in system information (e.g. SIB1). However, the LTE/EPC cell will broadcast a Tracking Area Code (TAC), primarily intended for idle UEs to identify whether they shall perform tracking area updates or not. Hence, as in NR the RAN Area Configuration has been defined as partially comprised of a TAC, another solution is to define the mixed RNA comprising of TACs from both NR and LTE/EPC.

The current configuration of the cell list for the RNA in NR is specified as:

```
RAN-NotificationAreaInfo ::=        CHOICE {
    cellList                PLMN-RAN-AreaCellList,
    ran-AreaConfigList      PLMN-RAN-AreaConfigList,
    ...
}
PLMN-RAN-AreaConfigList ::=         SEQUENCE (SIZE
                                    (1..maxPLMNIdentities)) OF
PLMN-RAN-AreaConfig
PLMN-RAN-AreaConfig ::=             SEQUENCE {
    plmn-Identity           PLMN-Identity
OPTIONAL, -- Need S
    ran-Area                SEQUENCE (SIZE (1..16))
                                    OF RAN-AreaConfig
}
RAN-AreaConfig ::=                  SEQUENCE {
    trackingAreaCode        TrackingAreaCode,
    ran-AreaCodeList        SEQUENCE (SIZE (1..32))
                                    OF RAN-AreaCode
OPTIONAL -- Need R
}
```

However, the Tracking Area Code used for the NR RNA is defined as:

TrackingAreaCode information element

```
-- ASN1START
-- TAG-TRACKINGAREACODE-START
TrackingAreaCode ::= BIT STRING (SIZE (24))
-- TAG-TRACKINGAREACODE-STOP
-- ASN1STOP
```

Whereas a TAC in LTE/EPC is defined as having 16 bits, as shown below:

CellAccessRelatedInfo-EUTRA-EPC information element

```
-- ASN1START
-- TAG-CELL-ACCESS-RELATED-INFO-EUTRA-EPC-START
CellAccessRelatedInfo-EUTRA-EPC ::=         SEQUENCE {
    plmn-IdentityList-eutra-epc         PLMN-IdentityList-EUTRA-EPC,
    trackingAreaCode-eutra-epc          BIT STRING (SIZE (16)),
    cellIdentity-eutra-epc              BIT STRING (SIZE (28))
}
PLMN-IdentityList-EUTRA-EPC::=              SEQUENCE (SIZE (1..maxPLMN)) OF
PLMN-Identity
-- TAG-CELL-ACCESS-RELATED-INFO-EUTRA-5GC-STOP
-- ASN1STOP
```

Extending Definition of TAC to Include LTE Cells

In one embodiment, the LTE TAC is padded from 16 bits to 24 bits, with e.g. 8 leading zeros. To enable this, the network planning of NR TAIs would require to avoid configuring any NR TAI with 8 leading zeros. However, since the NR TAC is 24 bits, while the LTE TAC is only 16 bits, restricting the range of NR TACs would still allow for $2^{24}-2^{16}$ unique values (approx. 16 million values) for the NR TACs.

Extending RNA to Comprise Separate TACs for NR and LTE

In another embodiment, the RRCRelease message is extended to include a separate list for LTE cells in the RAN Notification Area configuration. An alternative solution is to define that each element is either an LTE/EPC TAC or NR TAC, i.e., with 16 bits or 24 bits, respectively.

Since the RAN-NotificationAreaInfo IE is an extendable CHOICE structure, one alternative is to add the inter-RAT RNA in that IE as shown by the following example:

```
RAN-NotificationAreaInfo ::=        CHOICE {
    cellList                PLMN-RAN-AreaCellList,
    ran-AreaConfigList      PLMN-RAN-AreaConfigList,
    ...
    [[ ran-AreaConfiginterRAT            PLMN-RAN-AreaConfigListInterRAT,
    ]]
}
PLMN-RAN-AreaConfigListInterRAT ::=          SEQUENCE (SIZE (1..
maxPLMNIdentities)) OF PLMN-RAN-Area ConfigInterRAT
PLMN-RAN-AreaConfigInterRAT ::=              SEQUENCE {
```

```
  plmn-Identity                    PLMN-Identity
OPTIONAL, -- Need S
    ran-Area                       SEQUENCE (SIZE (1..32)) OF RAN-
AreaConfigInterRAT
}
RAN-AreaConfigInterRAT ::=         SEQUENCE {
    trackingAreaCodeInterRAT :: CHOICE {
        nrTrackingAreaCode                 TrackingAreaCode,
        trackingAreaCode-eutra-epc         BIT STRING (SIZE (16))
}
ran-AreaCodeList        SEQUENCE (SIZE (1..32)) OF RAN-AreaCode
OPTIONAL  -- Need R
}
```

In the case RANAC identifiers are not defined in EPC, the last field is always absent in case of an EPC TAC.

In another embodiment, the suspendConfig IE is extended to include a separate LTE RNA configuration possibly containing a list of LTE EPC TAIs.

In another embodiment, the LTE/EPC system information is extended to broadcast a RAN Area Code (same as is done in LTE/5GC and NR). This LTE/EPC RANAC may be the same or different as the RANAC defined for LTE/5GC and NR.

For instance, in case the base station is connected to both EPC and 5GC, i.e. it supports both LTE/EPC and LTE/5GC, the UE can be configured with the RANAC associated with the LTE/5GC cell, even though it is camping on the LTE/EPC cell.

Solutions Related to Inter-Node Messages to Support Inter-RAT RNAs

One factor in supporting inter-RAT RAN Notification Areas is the ability to perform RAN paging.

Whenever a UE is suspended to RRC_INACTIVE, the UE is able to reselect between cells within the configured RAN Notification Area (RNA) without performing any location updates, e.g. RAN Area updates or Tracking Area Updates. This means that the RAN is only aware that the UE is camping on one of the cells within the RNA, but not necessarily which cell inside the RNA. If any DL service arrives in the source node (e.g. DL data, incoming voice/video call, other signalling, etc.), the source node needs to be able to page the UE. In Rel-15, the concept of RAN paging was introduced over the inter-node interface Xn, between NR nodes (gNBs) or LTE/5GC nodes (ng-eNB).

However, since the RRC_INACTIVE state is not supported for LTE/EPC, the X2 interface does not support RAN paging. Thus, if an LTE/EPC cell would be included in the RNA and the UE would reselect to it, the source NR node would not be able to forward the RAN paging to the LTE/EPC node.

In one embodiment, similar procedures as supported in XnAP are introduced in X2AP for the X2 interface (or EN-DC X2 interface), e.g.:

RAN PAGING, with the associated IEs

If the RAN paging is triggered by DL data, this DL data needs to be forwarded to the target node, to avoid the loss of the DL data. Since both LTE and NR supports data forwarding in case of intra-RAT handover, and NR supports data forwarding in case of RAN paging, the same procedure can be implemented for RAN paging between NR and LTE/EPC. The procedures needed to be supported in case of RAN paging could be e.g.:

RETRIEVE UE CONTEXT REQUEST/RESPONSE
DATA FORWARDING ADDRESS INDICATION

These procedures are heretofore only supported for intra-LTE communication but would need to be extended to inter-RAT communication. The data forwarding address indication will provide a forwarding Generic Tunnelling Protocol (GTP) tunnel end point identifier (including an IP address) which the paging node can send any Data packet to. An alternative to using these procedures for handling packet forwarding is to forward the data packet directly from the paging RAN node using X2-AP signalling (i.e. the data PDU will be forwarded inside the X2-AP control plane message).

In case the paging was triggered by DL NAS signalling arriving in the serving RAN node, it may not be required to forward the NAS signalling message to the target RAN node (the node that the UE responded in). Instead, the serving RAN node can send a message to the CN indicating that the NAS message was not delivered. The CN can then redo the procedure in the target RAN node.

If a UE in RRC_INACTIVE, configured with both NR and LTE/EPC cells, is camping on an LTE/EPC cell inside the RNA and receives a RAN page, the UE will perform a NAS procedure, e.g. Tracking Area Update, Registration Update, Service Request, etc. In doing so, the UE will prepare and transmit an LTE RRCConnectionRequest message with a UE Identity comprising either the S-TMSI or a random value.

Since the UE has been assigned an identifier, by the serving RAN node (e.g. at the time it was suspended), used to page the UE, e.g. the I-RNTI, the UE could use this value as the random value in the identifier. Since the LTE RAN node performed the RAN paging with the UE identity (e.g. I-RNTI), the LTE RAN node can expect this identifier to be used in the connection request. Alternatively, the UE could send the identifier in another message (such as the RRC connection setup complete message).

In addition, in order for the source network node to configure the RAN Notification Area when the UE is suspended to RRC_INACTIVE, the source node needs to be aware of which cells are possible and suitable to include. In order to ensure reachability of the UE, the source RAN node must be able to page the UE in any of the cells inside the RNA, e.g. through RAN paging. In case of LTE/EPC RAN nodes, some of these will be legacy base stations, which does not support RAN paging or RNA configurations. To enable this exchange of information between the LTE RAN nodes and the source NR RAN node, the inter-node messaging over e.g. X2 could be extended with e.g.:

For LTE RAN nodes to inform NR RAN nodes if they support paging to allow NR nodes to use this feature only with LTE RAN nodes that support it. This information could be added to the X2 setup signalling (e.g. X2 setup request/response) or other signalling.

For LTE RAN nodes to inform NR RAN nodes which cells, RAN areas, Tracking Areas they support, to allow NR node to assign UEs these areas. This information could be added to the X2 setup signalling or other signalling.

For NR RAN nodes to inform LTE RAN nodes that they support this feature. This information could be added to the X2 setup signalling or other signalling.

Figure 11:
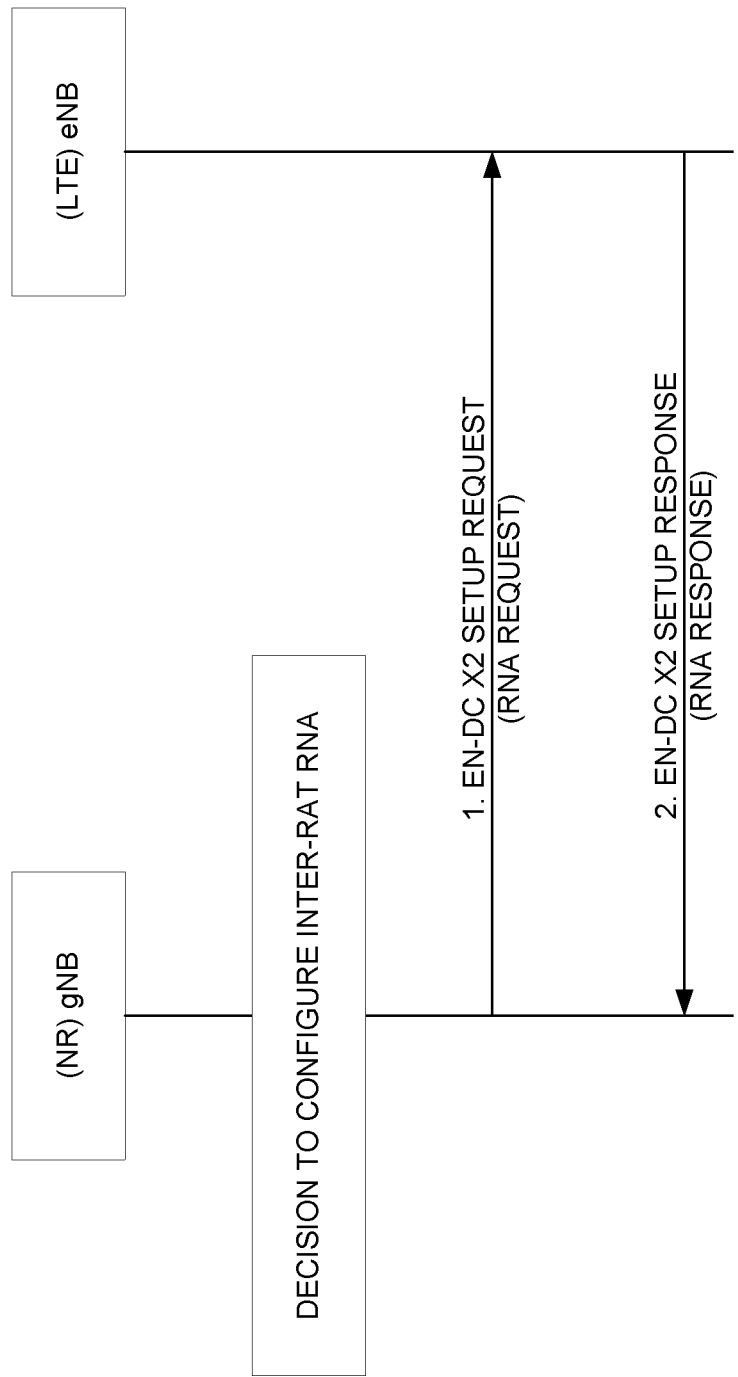
FIG. 11 is a signalling diagram for setting up an inter-node interface between an NR gNB and an LTE/EPC eNB.

FIG. 11 shows an example signalling diagram for setting up an inter-node interface between an NR gNB and an LTE/EPC eNB. In the figure, the existing message EN-DC X2 SETUP REQUEST/RESPONSE are used with extensions to include RAN Notification Area information. In another embodiment, a new X2 message is introduced to convey this information.

Solutions for Enabling Optionality of Support for Inter-System RNA

As not all UEs may need to support this feature, e.g. if the feature is introduced in later releases of the specifications, the UE will have to inform the network whether it supports the feature or not. This information can be introduced as a capability which the UE sends to the network upon request.

The exact name and placement of the capability parameter can be many different options. For instance, in one embodiment, the capability is introduced in NR specification in the InterRAT-Parameters information element as an extension to the E-UTRA-Parameters IE with the field name inter-RAT-RNA. The IE InterRAT-Parameters is used convey UE capabilities related to the other RATs.

| InterRAT-Parameters information element |
| --- |

```
-- ASN1START
-- TAG-INTERRAT-PARAMETERS-START
InterRAT-Parameters ::=           SEQUENCE {
    eutra              EUTRA-Parameters              OPTIONAL,
    ...
}
EUTRA-Parameters ::=              SEQUENCE {
    supportedBandListEUTRA        SEQUENCE (SIZE (1..maxBandsEUTRA)) OF FreqBandIndicatorEUTRA,
    eutra-ParametersCommon        EUTRA-ParametersCommon              OPTIONAL,
    eutra-ParametersXDD-Diff      EUTRA-ParametersXDD-Diff            OPTIONAL,
    ...,
    [[ interRAT-RNA    ENUMERATED {supported}        OPTIONAL,
    ]]
}
EUTRA-ParametersCommon ::=        SEQUENCE {
    mfbi-EUTRA         ENUMERATED {supported}        OPTIONAL,
    modifiedMPR-BehaviorEUTRA     BIT STRING (SIZE (32))   OPTIONAL,
    multiNS-Pmax-EUTRA            ENUMERATED {supported}   OPTIONAL,
    rs-SINR-MeasEUTRA             ENUMERATED {supported}   OPTIONAL,
    ...
}
EUTRA-ParametersXDD-Diff ::=      SEQUENCE {
    rsrqMeasWidebandEUTRA         ENUMERATED {supported}
OPTIONAL,
    ...
}
-- TAG-INTERRAT-PARAMETERS-STOP
-- ASN1STOP
```

In another embodiment the capability parameter is introduced as an extension to InterRAT-Parameters:

```
InterRAT-Parameters ::=     SEQUENCE {
    eutra               EUTRA-Parameters     OPTIONAL,
    ...,
    [[ interRAT-RNA     ENUMERATED {supported} OPTIONAL,
    ]]
}
```

In another embodiment, the capability parameter is introduced in the EUTRA-ParametersCommon IE:

```
EUTRA-ParametersCommon ::=     SEQUENCE {
    mfbi-EUTRA              ENUMERATED       OPTIONAL,
                            {supported}
    modifiedMPR-BehaviorEUTRA BIT STRING     OPTIONAL,
                            (SIZE (32))
    multiNS-Pmax-EUTRA      ENUMERATED       OPTIONAL,
                            {supported}
    rs-SINR-MeasEUTRA       ENUMERATED       OPTIONAL,
                            {supported}
    ...,
    [[ interRAT-RNA         ENUMERATED       OPTIONAL,
                            {supported}
    ]]
}
```

In each of these example, the field is called interRAT-RNA, encoded as an optional single valued enumerated with the value supported (same as most other capabilities in TS 38.331), but any other coding (e.g. Boolean or Choice) could be used to the same effect. The name of the field can be anything as it is only used to convey the purpose of the signalling.

In another embodiment, another capability IE is used, e.g. UE-MRDC-Capability or UE-NR-Capability or a new capability field is introduced.

In another embodiment, an existing capability bit is used to signal the support. For instance, if the UE supports inactive state, it also supports inter-RAT/inter-system RNA, i.e. if the capability parameter inactiveState is set to supported then the UE supports both RRC_INACTIVE and inter-RAT/inter-system RNAs.

Figure 12A:
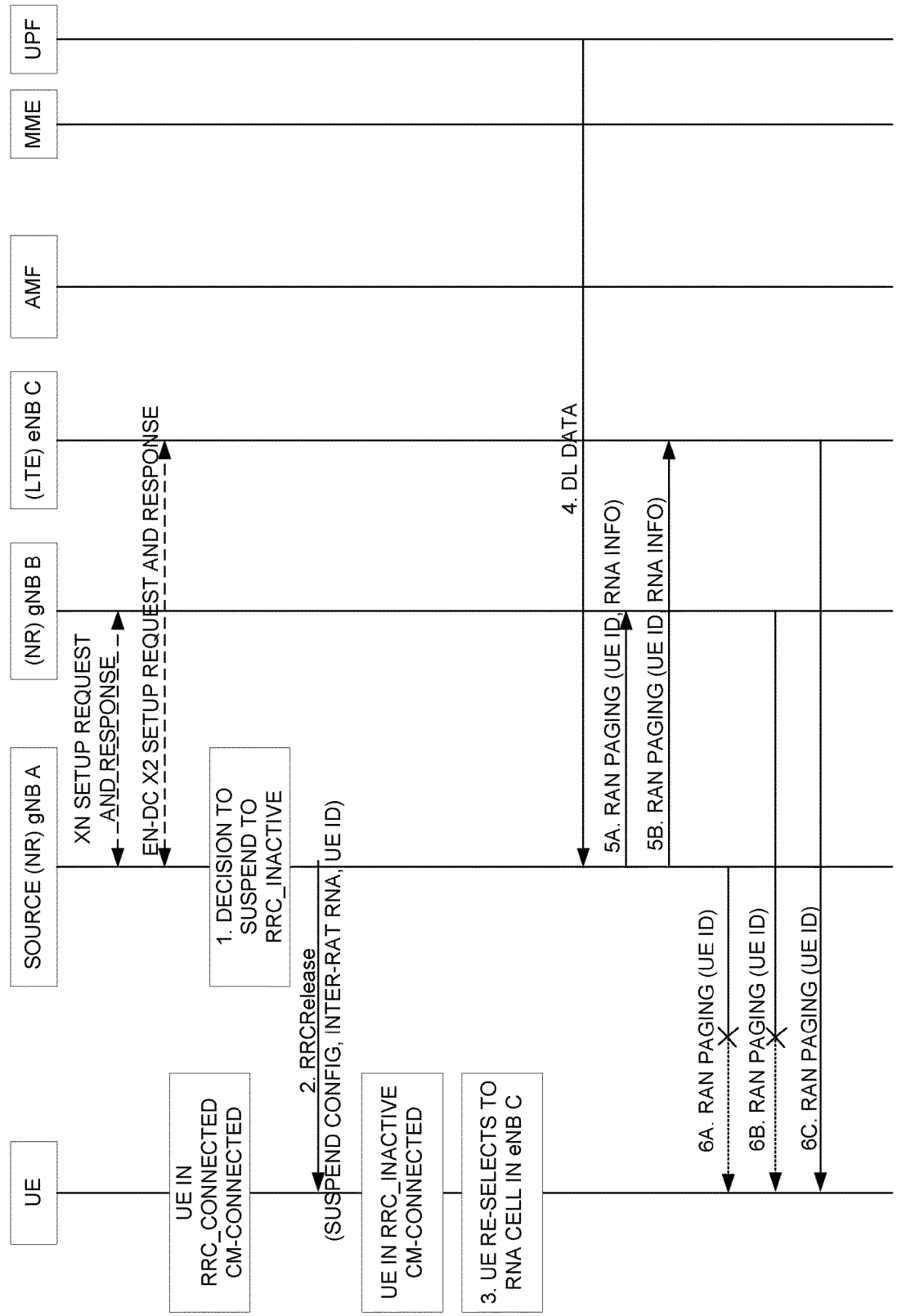
FIGS. 12A-12B are signalling diagrams for a UE configured with an inter-RAT RAN Notification Area consisting of both NR and LTE/EPC cells, which has reselected to an LTE/EPC cell when DL data arrives in the source NR RAN node.
Figure 12B:
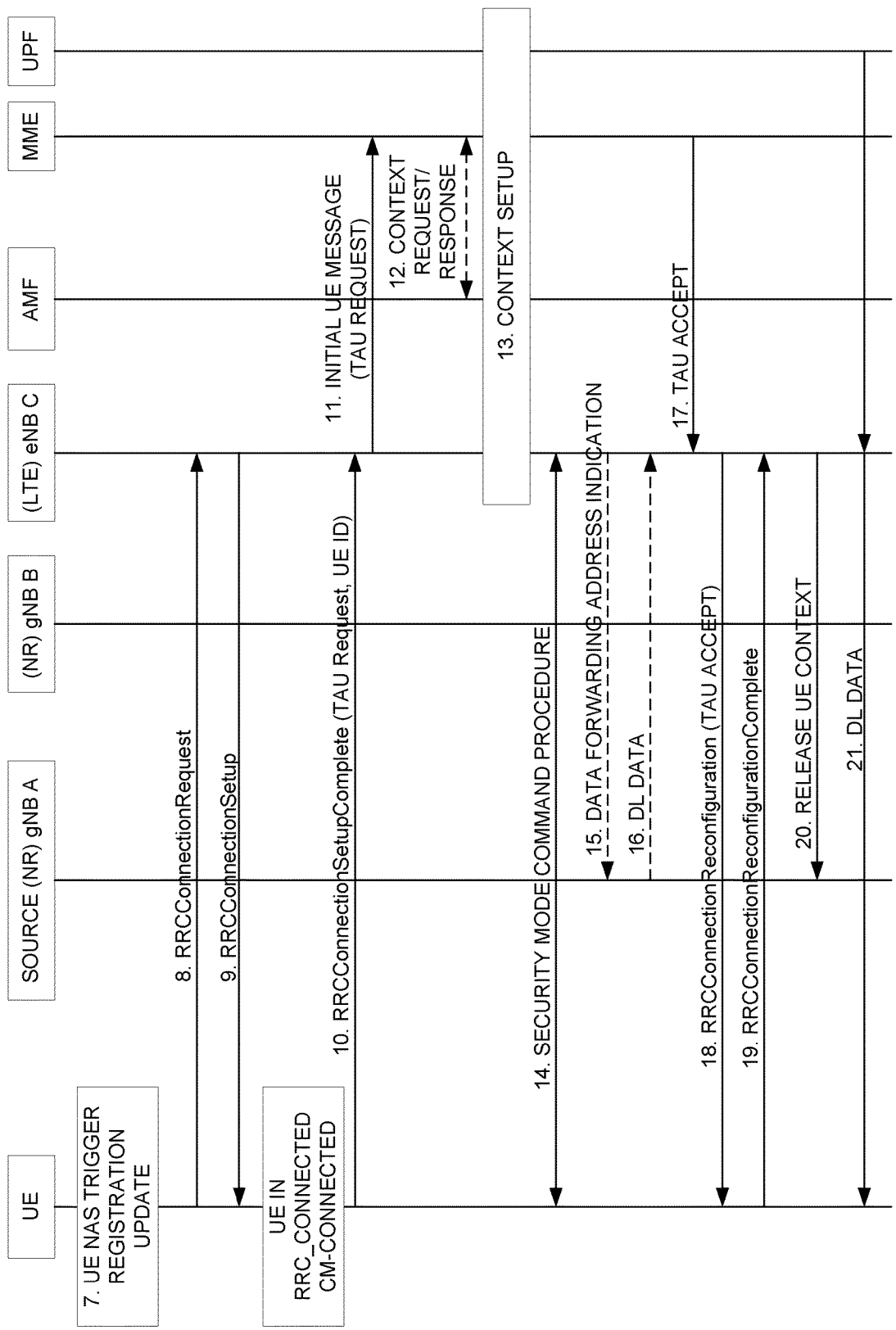

To illustrate the procedure discussed, FIGS. 12A-12B show an example signalling diagram for a UE configured with an inter-RAT RAN Notification Area consisting of both NR and LTE/EPC cells, which has reselected to an LTE/EPC cell when DL data arrives in the source NR RAN node (gNB).

0. Prior to configuring the UE, the source gNB has established inter-node interfaces to the neighbour RAN nodes which may be included in UE specific RNAs. For neighbour NR nodes (gNBs), the Xn interface is used, while for neighbour LTE/EPC nodes, the EN-DC X2 interface is used.
1. The source gNB decides that a connected UE shall be suspended to RRC_INACTIVE, e.g. due to inactivity.
2. The source gNB transmits an RRCRelease message with suspendConfig, which contain a RAN Notification Area comprising both NR cells in e.g. gNB A and gNB B as well as LTE/EPC cells in eNB C. The message also contains UE identifiers to be used for paging the UE in RRC_INACTIVE and for the network to identify the UE when it returns. This identifier could be the same identifier for both LTE/EPC and NR (e.g. the I-RNTI), or there could be different identifiers for the different RATs (e.g. comprising existing or new identifiers).
3. UE re-selects to LTE/EPC cell in the RNA in eNB C based on inactive mode measurements and configured priorities.
4. DL Data for the UE arrives from the UPF
5. gNB A requests neighbour RAN nodes (gNB B and eNB C) configured in the RNA to page the UE with a UE Identifier. This identifier could be the I-RNTI, S-TMSI, or any other UE identifier
6. gNB A, gNB B and eNB C page the UE using the UE identifier received in step 5
7. UE receives the page from the LTE/EPC cell, which triggers a NAS Tracking Area Update.
8. UE transmits the RRCConnectionRequest message. This message could include the UE ID as an alternative to message 10 below.
9. eNB C responds with an RRCConnectionSetup and the UE enters RRC_CONNECTED
10. UE responds with an RRCConnectionSetupComplete containing the NAS TAU Request message and the UE identifier received in step 2
11. eNB send the Initial UE Message containing the TAU Request to an MME.
12. MME retrieves the UE context from the source AMF via the N26 interface
13. A context is setup in EPS, possibly mapped from the context retrieved from 5GS in step 12.
14. UE and eNB C performs initial security activation in the RAN
15. eNB C uses the UE identifier received in step 10 to locate where the RAN paging arrived from and sends a message to the source gNB A indicating a data forwarding address
16. The source gNB A forwards the DL Data triggering the initial RAN paging
17. The MME sends a TAU Accept message to the eNB C
18. The eNB C sends a RRCConnectionReconfiguration message configuring the SRB2 and the DRBs. The message also contains the NAS TAU Accept message
19. The UE responds with a RRCConnectionReconfigurationComplete message
20. The eNB C request the source gNB A to release the UE context
21. The DL data forwarded from the source gNB A can be sent to the UE along with new data from the CN The order of the steps above could be different in different implementations. E.g. step 15/16 could be performed before step 14 or after step 18 or in parallel to any other steps.

In another embodiment, the UE ID is not included in message 10 (RRCConnectionSetupComplete) or message 8. Instead, when the MME requests the UE context from the source AMF via N26, it includes a data forwarding address indication via the CN so that once the new context has been setup, the DL data can be forwarded via N26. When all DL data has been forwarded from the source gNB A, the target MME can request the source AMF to release the UE context in the source gNB A. Alternatively, the AMF decides that the UE context in the source gNB A shall be released.

In another embodiment, the UE identity provided to the UE in the RRCRelease message (step 2), which the UE is paged with (step 6), the UE includes the value of this identifier as the random value in the UE identity in the RRCConnectionRequest message (step 8). Since the target eNB C has just paged the UE with this identifier, it can locate the source gNB A already after this step.

In another embodiment, steps 12 and 13 (Context Request and Context Setup) are performed without the N26 interface based on the same procedures defined for inter-system mobility in RRC_IDLE without N26 interface (c.f. TS 23.501 v15.3.0 section 5.17.2.3).

In some embodiments, in LTE, the UE is said to be camping in a cell when it is ready to access the cell, i.e. it has acquired the cell's system information and knows how to send a preamble to the RACH. The UE camps in a LTE cell in what is called the RRC IDLE state, which in LTE is the main sleeping state optimized for battery savings. In such a state, mobility is performed by UE via cell reselection and the UE is not known at the RAN level but only at the core network level In what is called a Tracking Area or Tracking Area list composed by a set of LTE cells. This is needed in the case the network needs to contact the UE, e.g. via paging. As such, in the worst case, the CN needs to send a paging command to the cells belonging to the Tracking Area list that the UE has been configured with. As the UE moves around the network it needs to inform the core network, more specifically the MME, via NAS signaling in the case it has changed its Tracking Area to a Tracking Area not in the Tracking Area list so that the network can still page the UE. Similar but slightly different concepts are also used in 2G (GSM/GPRS), 3G (WCDMA/UMTS. CDMA2000, CDMA EV-DO) systems.

Traditionally, a terminal device (UE) in a sleep state, e.g. idle mode/inactive state/suspended state, camps in one cell within one RAT, e.g. GSM, UMTS, or LTE. By "camp" or "camping", it is meant that the UE monitors a set of downlink control channels. For LTE, this means that the UE is monitoring the PCI and reference signals which are ceil specific and reads the system information when appropriate. In addition, the UE in LTE monitors the PDCCH to check for pages at its specific paging occasions. The UE has therefore acquired the system information and is ready to access the cell.

Hence, in the context of the present description the term "camping area" (CA) is defined as a general term for the kind and/or size of an area (such as an area being related to a cell, a coverage area that relies on beamforming, a tracking area, a set of beams represented by beam identifiers, and the like), and can be used to build up a definition of an area in which a UE is allowed to move around without informing the network of its whereabouts. In LTE a CA is realized as a Tracking Area. With this term, the procedure of reporting the UE's location to the network is generally referred to as "Camping Area Update" or "CA Update" or "CAU". The network indicates presence of a CA by broadcasting the CA's CA Identifier (CAI) (e.g. the Tracking Area Identifier (TAI) in LTE). In NR, with respect to RRC Inactive state, a CA may be realized as a RAN notification area (RNA).

More particularly in this regard, a new RRC state in NR complements the existing states, RRC_IDLE and RRC_CONNECTED. The new state is referred to as RRC_INACTIVE and allows a UE to benefit from several aspects of the two original states. Similar to RRC_IDLE, the UE performs cell-reselection based on measurements of reference signals without providing the network with measurement reports. Additionally, when the network needs to reach the UE, e.g. when DL traffic has arrived, the network pages the UE which in turn performs a random access (RA) to connect to the network. Likewise, when the UE needs to initiate UL traffic, it performs a RA to the current cell to synchronize and connect to the network. What differs for RRC_INACTIVE compared to RRC_IDLE is that the UE and gNB maintains configurations obtained in RRC_CONNECTED related to e.g. AS context, security, and radio bearers so that after the RA, the UE can resume its old configurations without much delay. In addition, the gNB can maintain the CN/RAN interface (NG-C and NGU), further reducing the resumption latency. Since the UE resumption from RRC_INACTIVE to RRC_CONNECTED assumes that the old UE context can be reused, whichever cell the UE has re-selected must be able to retrieve the context from the old cell. If the context fetch fails, the network can instruct the UE to perform a RRC Connection Setup similar to the one performed from RRC_IDLE.

Since the RAN/CN connection can be maintained in RRC_INACTIVE, the CN will assume that the UE is in ECM_CONNECTED. Whenever the network needs to reach the UE, e.g. when there is DL data available, the network will need to page the UE, as the RRC connection is suspended. However, as the CN assumes that the UE is in connected mode, the CN cannot initiate the page, but rather the RAN will have to initiate the notification. To facilitate a more efficient paging scheme, the RAN can assign a limited area (called a RAN notification area), covering one or more cells, within which the UE can be paged by the RAN; this limited area may be referred to as a camping area in this context. While the UE moves within this RAN notification area it does not need to notify the network of its location. It is only when the UE moves outside the RAN notification area that it will have to signal the network of its new location and be assigned a modified RAN notification area. As the RAN notification area can be smaller than the CN Tracking Area, the RAN paging message can be sent out in a smaller number of cells than a typical CN paging. In some embodiments, a UE in the RRC_INACTIVE state can be configured by the last serving NG-RAN node with an RNA, where the RNA can cover a single or multiple cells, and shall be contained within the CN registration area. A RAN-based notification area update (RNAU) is periodically sent by the UE and is also sent when the cell reselection procedure of the UE selects a cell that does not belong to the configured RNA. There are several different alternatives on how the RNA can be configured. One alternative is a list of cells: A UE is provided an explicit list of cells (one or more) that constitute the RNA. Another alternative is a list of RAN areas: A UE is provided (at least one) RAN area ID, where a RAN area is a subset of a CN Tracking Area or equal to a CN Tracking Area. A RAN area is specified by one RAN area ID, which consists of a TAI and optionally a RAN area Code. A cell broadcasts a RAN area ID in the system information.

RRC_INACTIVE is a state where a UE remains in CM-CONNECTED and can move within an area configured by NG-RAN (the RNA) without notifying NG-RAN. In RRC_INACTIVE, the last serving gNB node keeps the UE context and the UE-associated NG connection with the serving AMF and UPF. If the last serving gNB receives DL data from the UPF or DL signalling from the AMF (except the UE Release Command and Reset messages) while the UE is in RRC_INACTIVE, it pages in the cells corresponding to the RNA and may send XnAP RAN Paging to neighbour gNB(s) if the RNA includes cells of neighbour gNB(s).

In some embodiments, with cell selection, the UE searches for a suitable cell of the selected PLMN, chooses that cell to provide available services, and monitors its control channel. This procedure is defined as "camping on the cell". The UE shall, if necessary, then register its presence, by means of a NAS registration procedure, in the tracking area of the chosen cell. As an outcome of a successful Location Registration, the selected PLMN then becomes the registered PLMN Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Figure 13:
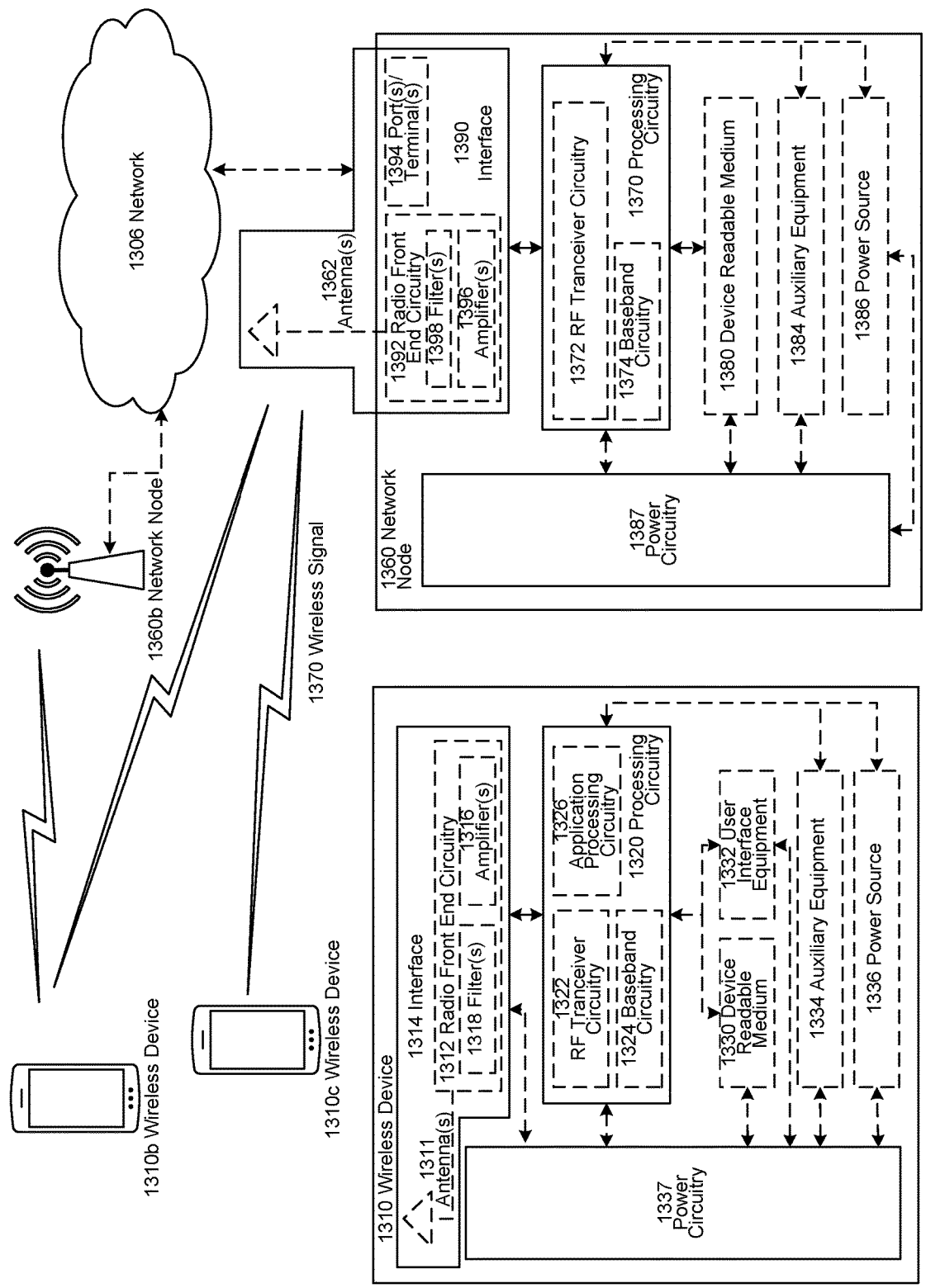
FIG. 13 is a block diagram of a wireless communication network according to some embodiments.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
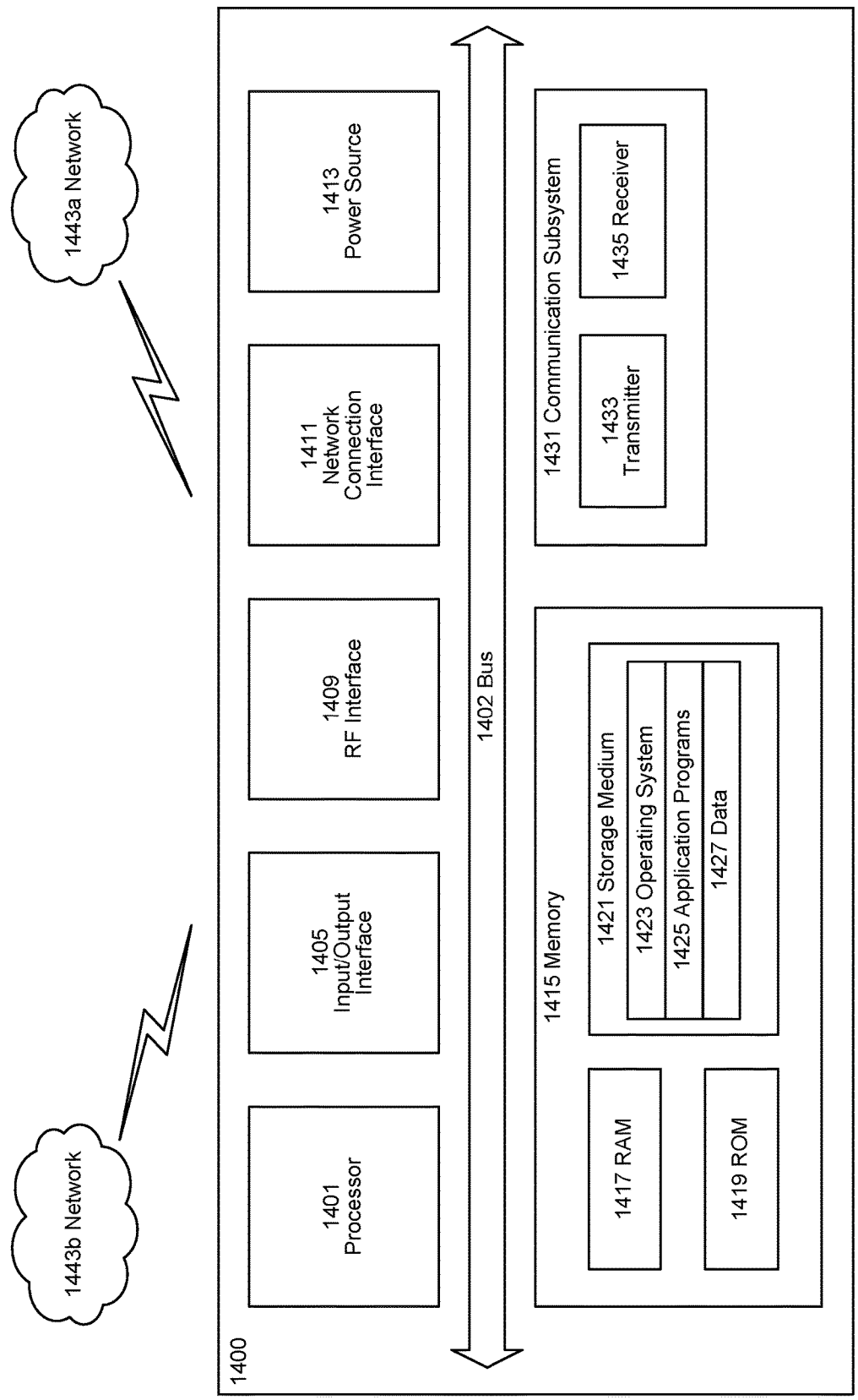
FIG. 14 is a block diagram of a user equipment according to some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443*a*. Network 1443*a* may encompass wired and/or wireless networks such as a local-area network (LAN), a wide-area network (WAN), a computer network, a wireless network, a telecommunications network, another like network or any combination thereof. For example, network 1443*a* may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443b using communication subsystem 1431. Network 1443a and network 1443b may be the same network or networks or different network or networks. Communication subsystem 1431 may be configured to include one or more transceivers used to communicate with network 1443b. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-Fi communication, Bluetooth communication, and GPS communication. Network 1443b may encompass wired and/or wireless networks such as a local-area network (LAN), a wide-area network (WAN), a computer network, a wireless network, a telecommunications network, another like network or any combination thereof. For example, network 1443b may be a cellular network, a Wi-Fi network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

Figure 15:
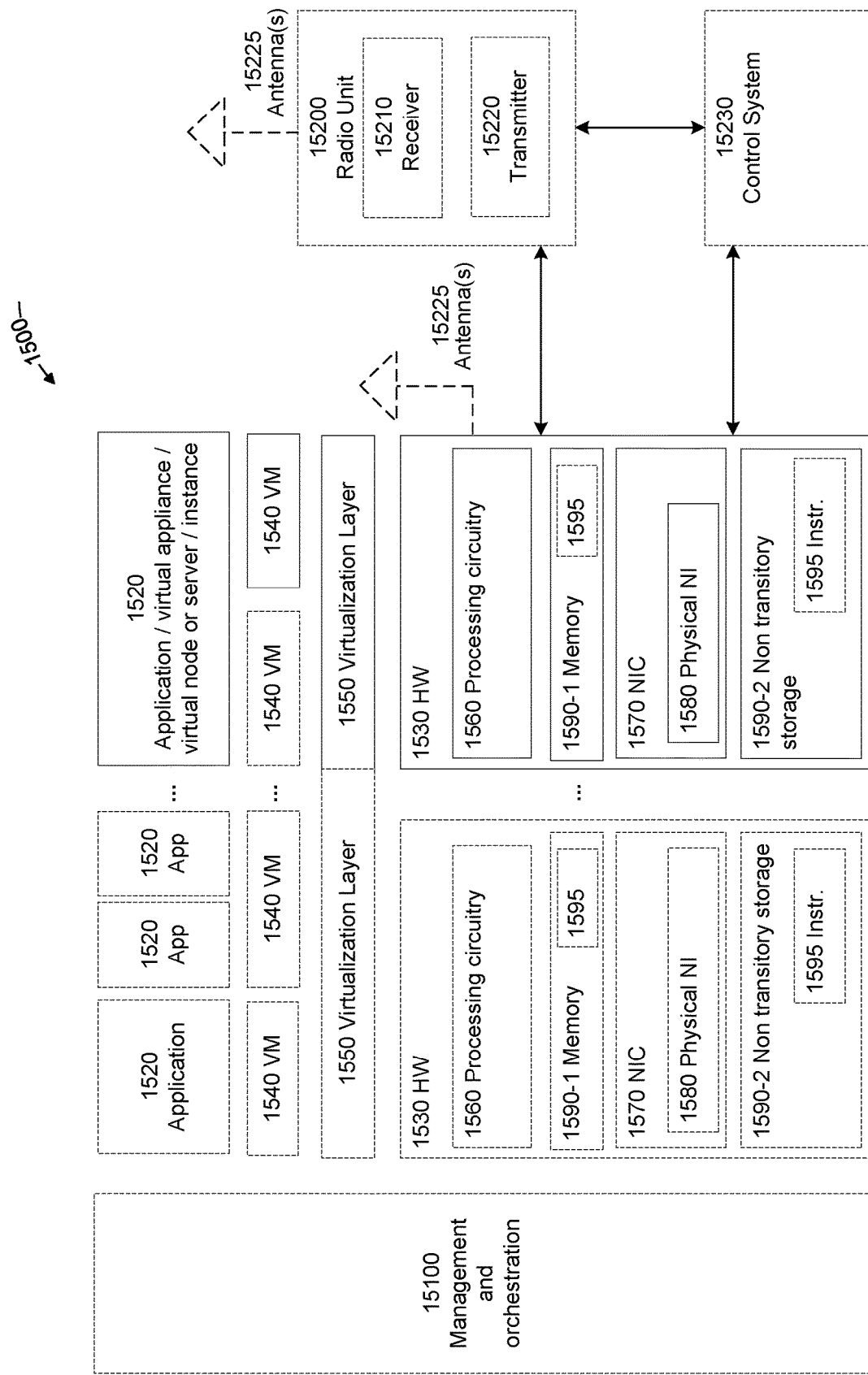
FIG. 15 is a block diagram of a virtualization environment according to some embodiments.

FIG. 15 is a schematic block diagram illustrating a virtualization environment 1500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be effected with the use of control system 15230 which may alternatively be used for communication between the hardware nodes 1530 and radio units 15200.

Figure 16:
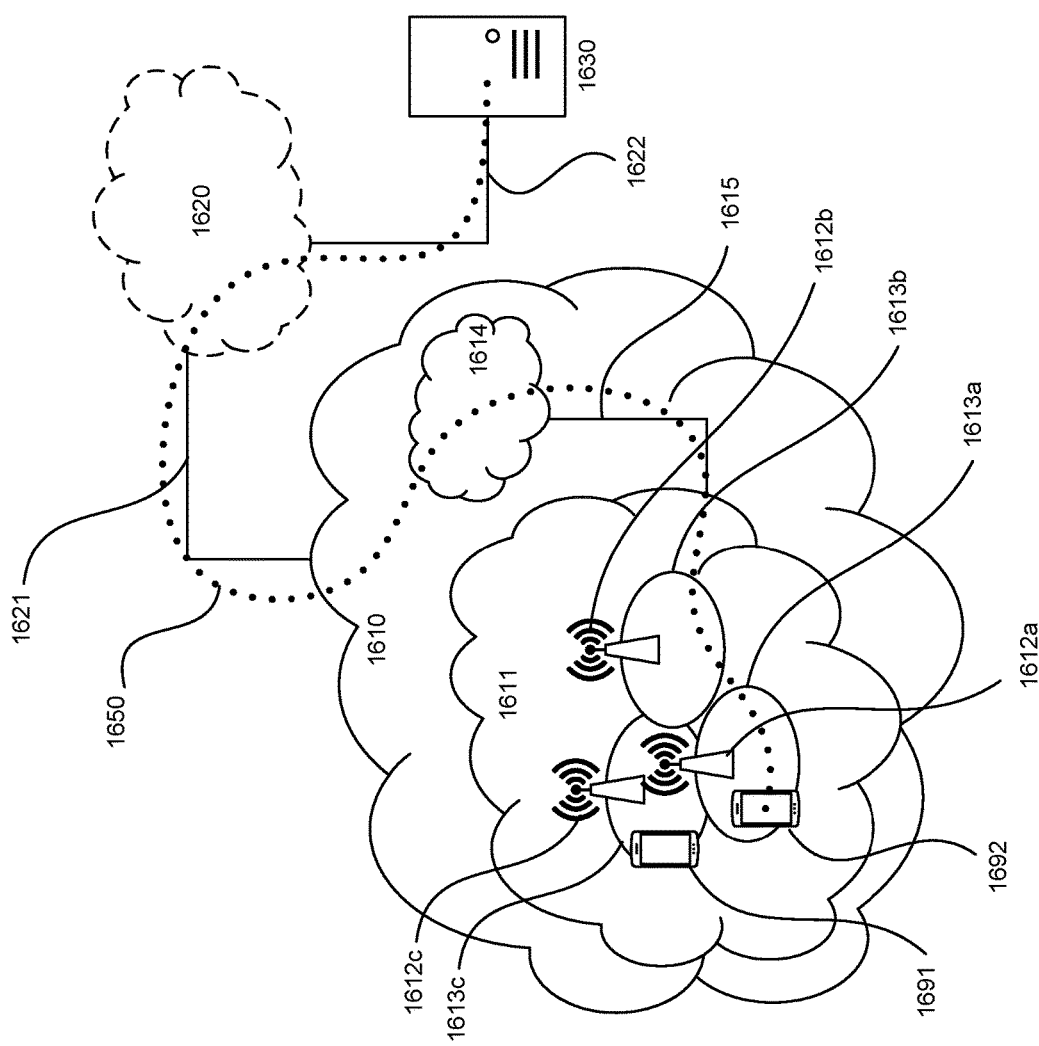
FIG. 16 is a block diagram of a communication network with a host computer according to some embodiments.

FIG. 16 illustrates a telecommunication network connected via an intermediate network to a host computer in accordance with some embodiments. In particular, with reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c is configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to the corresponding base station 1612.

Telecommunication network 1610 is itself connected to host computer 1630, which may be embodied in the hardware and/or software of a standalone server, a cloud-implemented server, a distributed server or as processing resources in a server farm. Host computer 1630 may be under the ownership or control of a service provider, or may be operated by the service provider or on behalf of the service provider. Connections 1621 and 1622 between telecommunication network 1610 and host computer 1630 may extend directly from core network 1614 to host computer 1630 or may go via an optional intermediate network 1620. Intermediate network 1620 may be one of, or a combination of more than one of, a public, private or hosted network; intermediate network 1620, if any, may be a backbone network or the Internet; in particular, intermediate network 1620 may comprise two or more sub-networks (not shown).

The communication system of FIG. 16 as a whole enables connectivity between the connected UEs 1691, 1692 and host computer 1630. The connectivity may be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 may be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Figure 17:
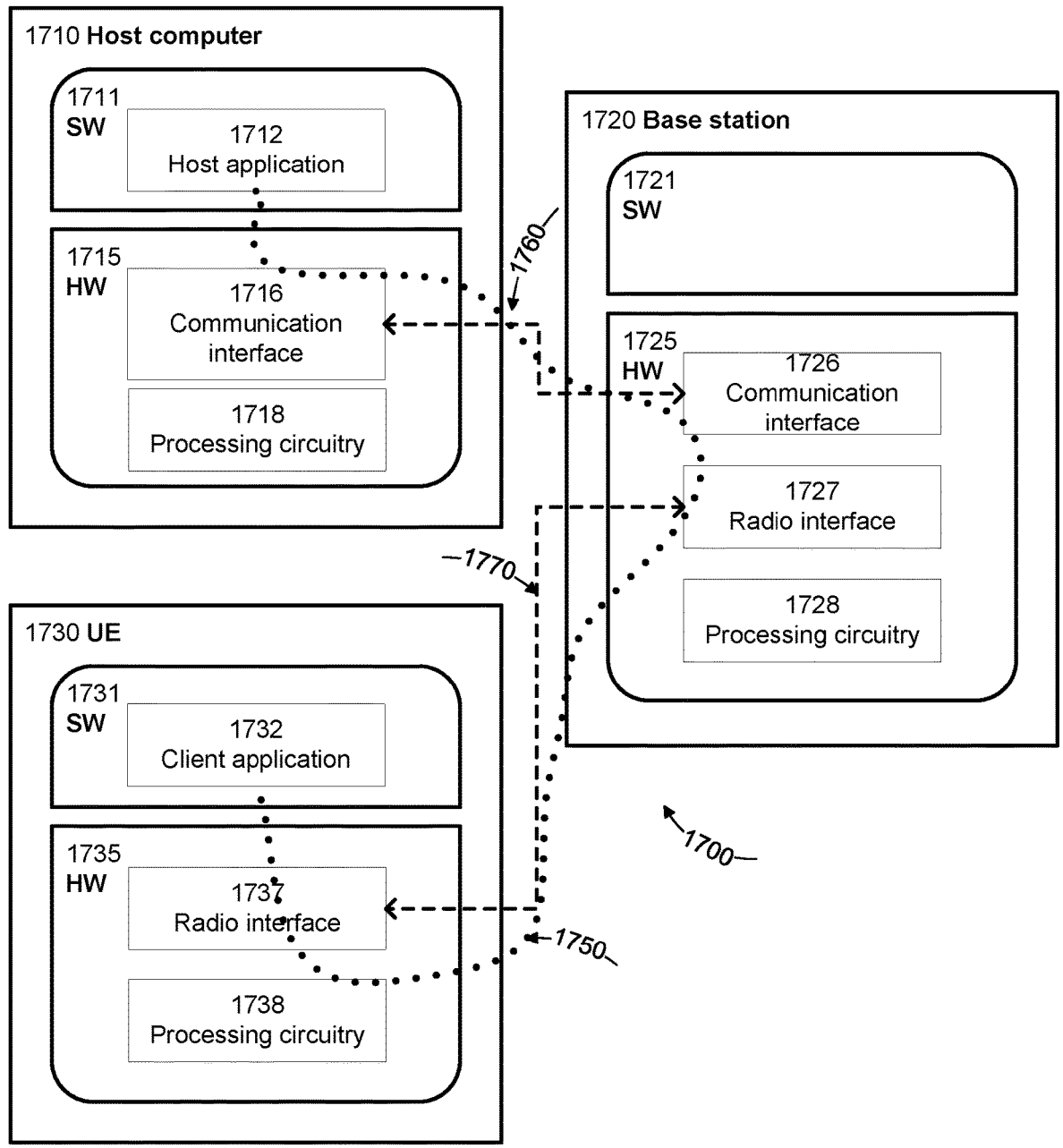
FIG. 17 is a block diagram of a host computer according to some embodiments.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which may have storage and/or processing capabilities. In particular, processing circuitry 1718 may comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 may be operable to provide a service to a remote user, such as UE 1730 connecting via OTT connection 1750 terminating at UE 1730 and host computer 1710. In providing the service to the remote user, host application 1712 may provide user data which is transmitted using OTT connection 1750.

Communication system 1700 further includes base station 1720 provided in a telecommunication system and comprising hardware 1725 enabling it to communicate with host computer 1710 and with UE 1730. Hardware 1725 may include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 may be configured to facilitate connection 1760 to host computer 1710. Connection 1760 may be direct or it may pass through a core network (not shown in FIG. 17) of the telecommunication system and/or through one or more intermediate networks outside the telecommunication system. In the embodiment shown, hardware 1725 of base station 1720 further includes processing circuitry 1728, which may comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 further includes UE 1730 already referred to. Its hardware 1735 may include radio interface 1737 configured to set up and maintain wireless connection 1770 with a base station serving a coverage area in which UE 1730 is currently located. Hardware 1735 of UE 1730 further includes processing circuitry 1738, which may comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 may be operable to provide a service to a human or non-human user via UE 1730, with the support of host computer 1710. In host computer 1710, an executing host application 1712 may communicate with the executing client application 1732 via OTT connection 1750 terminating at UE 1730 and host computer 1710. In providing the service to the user, client application 1732 may receive request data from host application 1712 and provide user data in response to the request data. OTT connection 1750 may transfer both the request data and the user data. Client application 1732 may interact with the user to generate the user data that it provides.

It is noted that host computer 1710, base station 1720 and UE 1730 illustrated in FIG. 17 may be similar or identical to host computer 1630, one of base stations 1612*a*, 1612*b*, 1612*c* and one of UEs 1691, 1692 of FIG. 16, respectively. This is to say, the inner workings of these entities may be as shown in FIG. 17 and independently, the surrounding network topology may be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure may determine the routing, which it may be configured to hide from UE 1730 or from the service provider operating host computer 1710, or both. While OTT connection 1750 is active, the network infrastructure may further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the teachings of these embodiments may reduce control signaling attributable to wireless device mobility between different types of wireless communication networks (e.g., with different types of core networks), in order to correspondingly conserve radio resource, processing resources, and power consumption and thereby provide benefits such as extended battery lifetime.

A measurement procedure may be provided for the purpose of monitoring data rate, latency and other factors on which the one or more embodiments improve. There may further be an optional network functionality for reconfiguring OTT connection 1750 between host computer 1710 and UE 1730, in response to variations in the measurement results. The measurement procedure and/or the network functionality for reconfiguring OTT connection 1750 may be implemented in software 1711 and hardware 1715 of host computer 1710 or in software 1731 and hardware 1735 of UE 1730, or both. In embodiments, sensors (not shown) may be deployed in or in association with communication devices through which OTT connection 1750 passes; the sensors may participate in the measurement procedure by supplying values of the monitored quantities exemplified above, or supplying values of other physical quantities from which software 1711, 1731 may compute or estimate the monitored quantities. The reconfiguring of OTT connection 1750 may include message format, retransmission settings, preferred routing etc.; the reconfiguring need not affect base station 1720, and it may be unknown or imperceptible to base station 1720. Such procedures and functionalities may be known and practiced in the art. In certain embodiments, measurements may involve proprietary UE signaling facilitating host computer 1710's measurements of throughput, propagation times, latency and the like. The measurements may be implemented in that software 1711 and 1731 causes messages to be transmitted, in particular empty or 'dummy' messages, using OTT connection 1750 while it monitors propagation times, errors etc.

Figure 18:
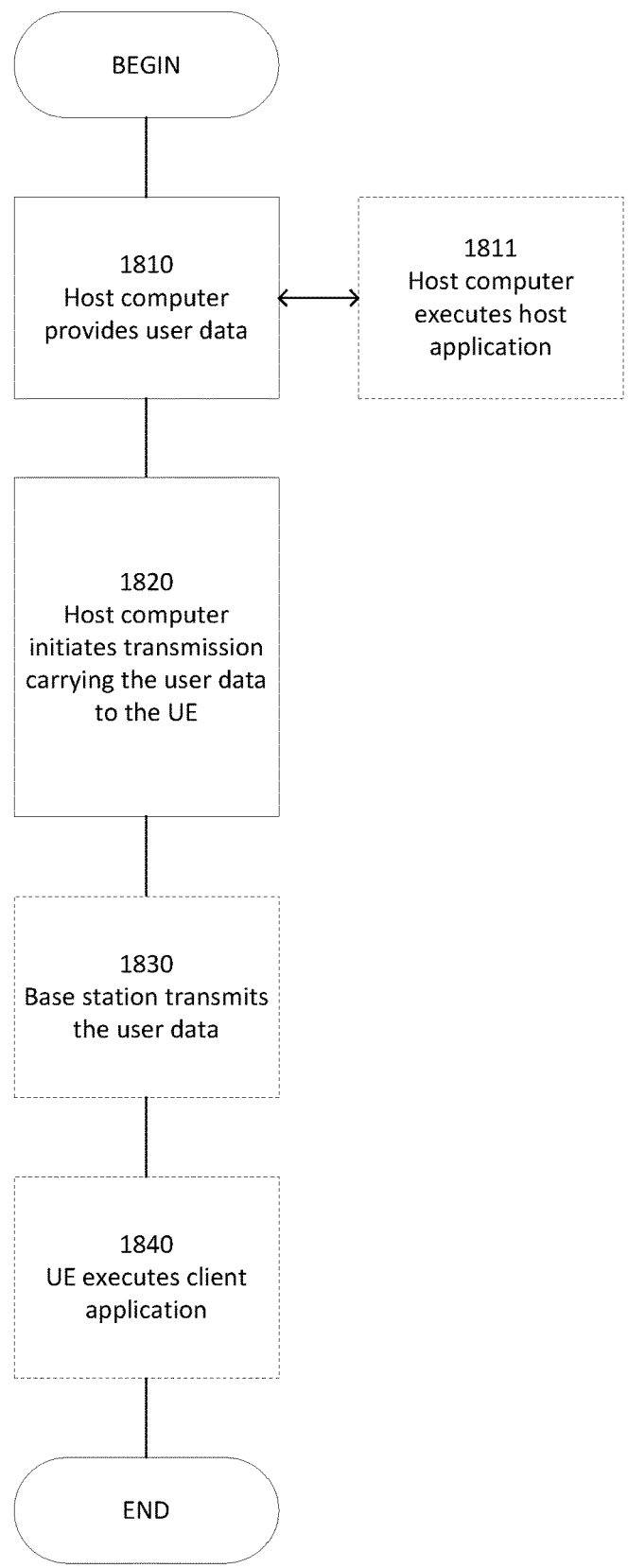
FIG. 18 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1810, the host computer provides user data. In substep 1811 (which may be optional) of step 1810, the host computer provides the user data by executing a host application. In step 1820, the host computer initiates a transmission carrying the user data to the UE. In step 1830 (which may be optional), the base station transmits to the UE the user data which was carried in the transmission that the host computer initiated, in accordance with the teachings of the embodiments described throughout this disclosure. In step 1840 (which may also be optional), the UE executes a client application associated with the host application executed by the host computer.

Figure 19:
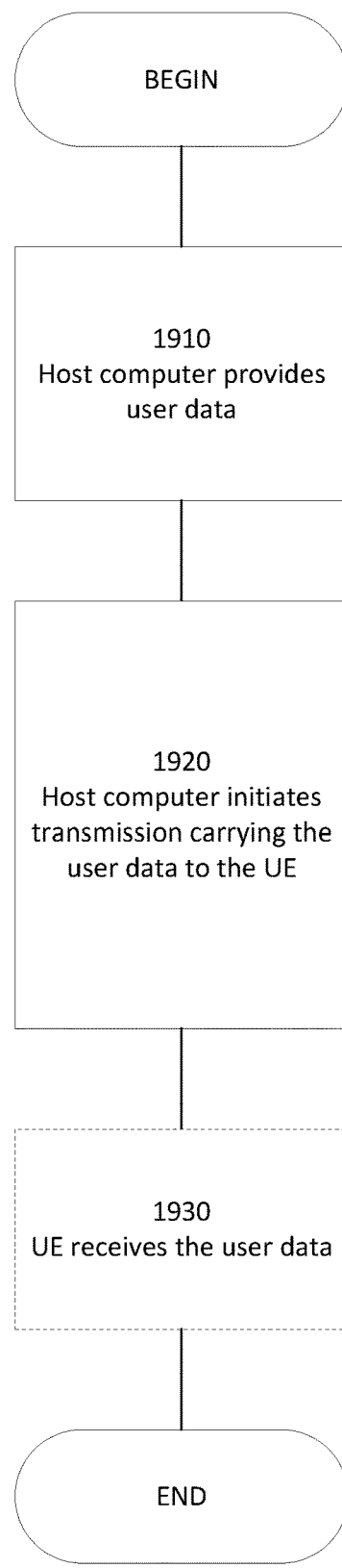
FIG. 19 is a flowchart illustrating a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission may pass via the base station, in accordance with the teachings of the embodiments described throughout this disclosure. In step 1930 (which may be optional), the UE receives the user data carried in the transmission.

Figure 20:
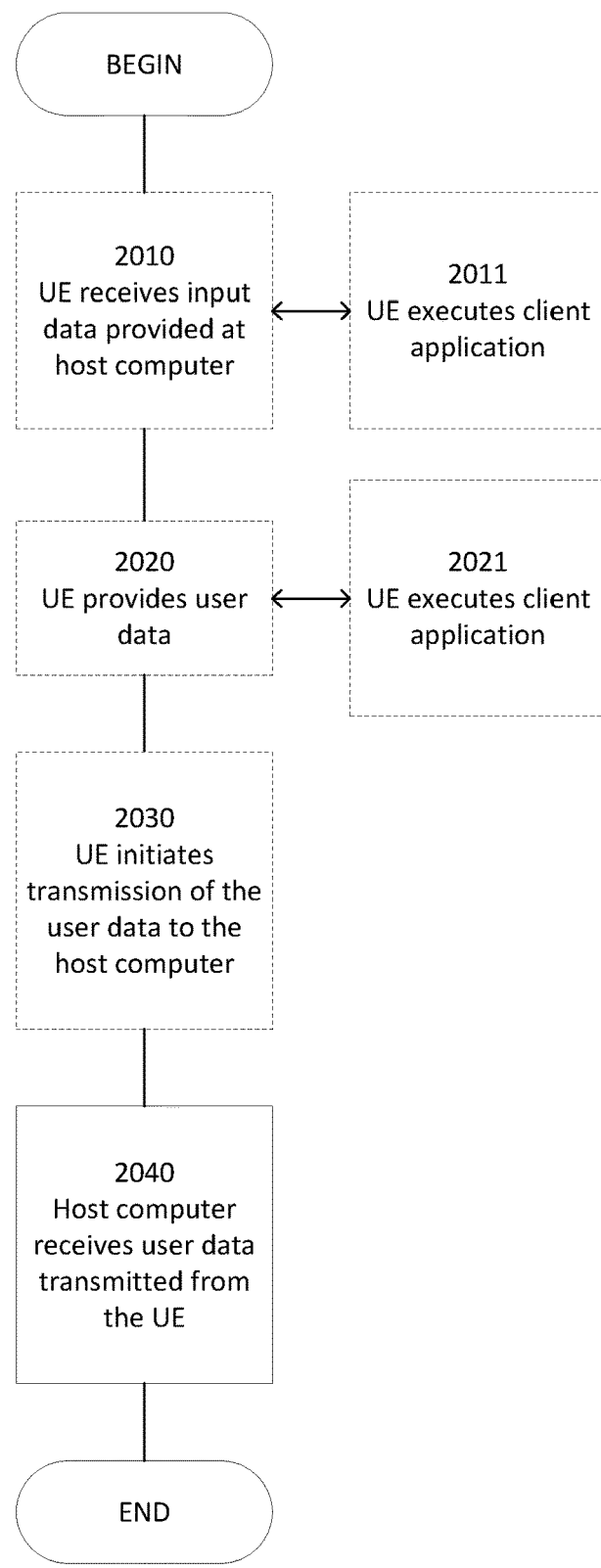
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 2010 (which may be optional), the UE receives input data provided by the host computer. Additionally or alternatively, in step 2020, the UE provides user data. In substep 2021 (which may be optional) of step 2020, the UE provides the user data by executing a client application. In substep 2011 (which may be optional) of step 2010, the UE executes a client application which provides the user data in reaction to the received input data provided by the host computer. In providing the user data, the executed client application may further consider user input received from the user. Regardless of the specific manner in which the user data was provided, the UE initiates, in substep 2030 (which may be optional), transmission of the user data to the host computer. In step 2040 of the method, the host computer receives the user data transmitted from the UE, in accordance with the teachings of the embodiments described throughout this disclosure.

Figure 21:
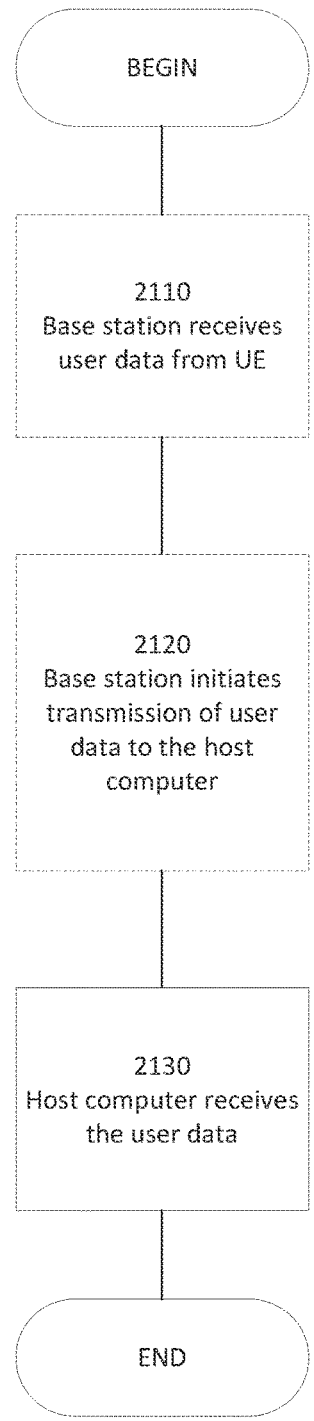
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 2110 (which may be optional), in accordance with the teachings of the embodiments described throughout this disclosure, the base station receives user data from the UE. In step 2120 (which may be optional), the base station initiates transmission of the received user data to the host computer. In step 2130 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE. In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device configured to operate in first and second access networks, the first and second access networks respectively providing access to first and second core networks of different types, a first wireless communication network comprises the first access network and the first core network, and a second wireless communication network comprises the second access network and the second core network, the method comprising:
receiving, from the first access network, control signaling indicating that the wireless device is to suspend a connection with the first access network and indicating a notification area within which the wireless device is allowed to move without notifying either the first and second wireless communication networks, the control signaling indicating that the notification area includes one or more areas of the first wireless communication network and one or more areas of the second wireless communication network;
suspending the connection with the first access network according to the control signaling; and
transmitting or not transmitting to the second access network signaling indicating that the wireless device one of is in an area of the second wireless communication network and that the wireless device requests a connection to the second access network, depending on whether the area of the second wireless communication network in which the wireless device is located is included in the notification area;
starting a timer upon the wireless device one of entering, camping in, and moving into the area of the second wireless communication network, and the transmitting or not transmitting comprises one of:
if the area is not included in the notification area, transmitting the signaling upon expiry of the timer; and
refraining from transmitting the signaling if the area is not included in the notification but the timer does not expire.

2. The method of claim 1, wherein the transmitting or not transmitting comprises transmitting or not transmitting the signaling to the second access network one of:
upon the wireless device one of entering, camping in, and moving into the area of the second wireless communication network; and
upon the wireless device one of entering, camping in, moving into, and selecting a cell that one of and is included in the area of the second wireless communication network.

3. The method of claim 2, wherein the transmitting or not transmitting comprises transmitting or not transmitting the signaling, depending respectively on whether the area is not included or is included in the notification area.

4. The method of claim 2, wherein the transmitting or not transmitting comprises:
refraining from transmitting the signaling if:
the area is included in the notification area.

5. The method of claim 1, further comprising monitoring a paging channel of the second access network for a paging message directed to the wireless device, using a paging identifier assigned to the wireless device by the first wireless communication network.

6. The method of claim 5, further comprising:
receiving a paging message on the monitored paging channel; and
responsive to receiving the paging message, transmitting to the second access network signaling indicating that the wireless device one of is in an area of the second wireless communication network and that the wireless device requests a connection to the second access network.

7. The method of claim 1, wherein:
at least one of:
the one or more areas of the first wireless communication network one of include and cover one or more cells of the first access network; and
the one or more areas of the second wireless communication network one of include cover one or more cells of the second access network; and
the one or more areas of the first wireless communication network at least one of:
one of include and cover one or more radio access network, RAN, areas of the first access network, wherein each RAN area of the first access network one of is and is a subset of a tracking area of the first core network; and
the one or more areas of the second wireless communication network one of include and cover one or more RAN areas of the second access network, wherein each RAN area of the second access network one of is and is a subset of a tracking area of the second core network.

8. The method of claim 1, wherein the connection is a radio resource control, RRC, connection, wherein the first core network is a 5G Core, 5GC, core network and the second core network is an Evolved Packet Core, EPC, core network.

9. The method of claim 1, wherein the first access network is a New Radio, NR, access network, and wherein the second access network is a Long Term Evolution, LTE, access network or an Evolved UMTS Terrestrial Radio Access Network, E-UTRAN.

10. The method of claim 1, wherein the control signaling indicates the one or more areas of the first wireless communication network using a subset of area identifiers reserved for the first wireless communication network and indicates the one or more areas of the second wireless communication network using a subset of area identifiers reserved for the second wireless communication network.

11. The method of claim 1, wherein the control signaling includes a sequence of one or more area identity information elements, wherein a subset of possible values of an area identity information element is reserved for indicating areas of the first wireless communication network and a different subset of possible values of an area identity information element is reserved for indicating areas of the second wireless communication network.

12. The method of claim 1, wherein the control signaling indicates the one or more areas of the first wireless communication network and the one or more areas of the second wireless communication network in separate lists of areas dedicated to the first and second wireless communication networks, respectively.

13. The method of claim 1, further comprising:
suspending the connection with the first access network according to the control signaling;

engaging in mobility to the second access network; and while the wireless device is inactive in the second access network, preserving a context for the connection to the first access network.

14. A wireless device configured to operate in first and second access networks, the first and second access networks respectively providing access to first and second core networks of different types, a first wireless communication network comprises the first access network and the first core network, and a second wireless communication network comprises the second access network and the second core network, the wireless device comprising:

communication circuitry; and processing circuitry configured to receive, from the first access network, control signaling indicating that the wireless device is to suspend a connection with the first access network and indicating a notification area within which the wireless device is allowed to move without notifying either the first and second wireless communication networks, the control signaling indicating that the notification area includes one or more areas of the first wireless communication network and one or more areas of the second wireless communication network;

suspend the connection with the first access network according to the control signaling; and transmit or not transmit to the second access network signaling indicating that the wireless device one of is in an area of the second wireless communication network and that the wireless device requests a connection to the second access network, depending on whether the area of the second wireless communication network in which the wireless device is located is included in the notification area;

start a timer upon the wireless device one of entering, camping in, and moving into the area of the second wireless communication network, and one of:

if the area is not included in the notification area, transmit the signaling upon expiry of the timer; and refrain from transmitting the signaling if the area is not included in the notification but the timer does not expire.

\* \* \* \* \*